United States Patent
Zhang et al.

(10) Patent No.: US 12,537,965 B2
(45) Date of Patent: Jan. 27, 2026

(54) IMAGE ENCODING AND DECODING METHOD AND APPARATUS

(71) Applicant: Huawei Technologies Co., Ltd., Shenzhen (CN)

(72) Inventors: Yixuan Zhang, Singapore (SG); Shaolin Chen, Shenzhen (CN); Yi Song, Shenzhen (CN); Peiyun Di, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 18/437,650

(22) Filed: Feb. 9, 2024

(65) Prior Publication Data
US 2024/0187611 A1   Jun. 6, 2024

Related U.S. Application Data

(63) Continuation of application No. PCT/CN2021/112252, filed on Aug. 12, 2021.

(51) Int. Cl.
H04N 19/176 (2014.01)
G06T 7/00 (2017.01)
H04N 19/119 (2014.01)
H04N 19/30 (2014.01)

(52) U.S. Cl.
CPC ......... *H04N 19/176* (2014.11); *G06T 7/0002* (2013.01); *H04N 19/119* (2014.11); *H04N 19/30* (2014.11); *G06T 2207/30168* (2013.01)

(58) Field of Classification Search
CPC .... H04N 19/176; H04N 19/119; H04N 19/30; G06T 7/0002; G06T 2207/30168
See application file for complete search history.

(56) References Cited

U.S. PATENT DOCUMENTS 9,378,561 B1   6/2016 Kohn et al.

FOREIGN PATENT DOCUMENTS

WO   2017154604 A1   9/2017

OTHER PUBLICATIONS

ISO/IEC 23008-2, Information technology—High efficiency coding and media deliver.
ITU-T H.265, Series H: Audiovisual and Multimedia Systems Infrastructure of audiovisual services-Coding of moving video, High efficiency video coding, Nov. 2019, total 712 pages.

*Primary Examiner* — Jae N Noh
(74) *Attorney, Agent, or Firm* — Slater Matsil, LLP

(57) ABSTRACT

This application provides an image encoding and decoding method and apparatus. The method may include: reading a first sub-image of a first frame of image from a first memory, and storing the first sub-image into a second memory, where the first memory is an off-chip memory, and the second memory is an on-chip memory; encoding a base layer of the first sub-image based on the first sub-image, to obtain a bitstream of the base layer of the first sub-image and a first reconstructed image; writing the first reconstructed image into the second memory; reading the first reconstructed image and the first sub-image from the second memory; and encoding a first enhancement layer of the first sub-image based on the first reconstructed image and the first sub-image, to obtain a bitstream of the first enhancement layer of the first sub-image and a second reconstructed image.

20 Claims, 7 Drawing Sheets

IMAGE ENCODING AND DECODING METHOD AND APPARATUS

CROSS-REFERENCE TO RELATED APPLICATIONS

This application is a continuation of International Application No. PCT/CN2021/112252, filed on Aug. 12, 2021, the disclosure of which is hereby incorporated by reference in its entirety.

TECHNICAL FIELD

This application relates to multimedia technologies, and more specifically, to an image encoding and decoding method and apparatus in the multimedia technologies.

BACKGROUND

A short-range wireless projection technology is a complete set of technologies in which video data generated by a mobile terminal with a strong processing capability, for example, a game image rendered by a graphics processing unit (GPU) is encoded and compressed, and is wirelessly sent to a device with a weak processing capability but good display effect, for example, a television or a virtual reality (VR) helmet for display. This technology can implement connection and information sharing between a mobile device and another device.

Applications that adopt short-range wireless projection, such as game projection and VR glasses, have features of data exchange. Therefore, an end-to-end delay needs to be as low as possible. In addition, a wireless channel of a wireless local area network (Wi-Fi) is easily affected by a plurality of factors in a use environment such as noise and an interference signal. As a result, transmission bandwidth is unstable, causing data loss and further causing an image quality problem. Therefore, a projection system needs to have as strong anti-interference capability as possible against a channel change. To sum up, both the end-to-end delay and the anti-interference capability against the channel change are important factors that affect performance of the projection system and user experience.

The scalable coding (SVC) protocol technology refers to that an encoder encodes each frame of image in a source video into a plurality of image layers. The plurality of image layers correspond to different quality or resolutions, and there is a reference relationship between the plurality of image layers. During transmission, bitstreams of the image layers are transmitted in an order from an image layer with lower quality/smaller resolution to an image layer with higher quality/larger resolution. A larger quantity of image layers of a frame of image received by a decoder indicates better quality of a reconstructed image.

In an existing scalable encoding and decoding solution, before encoding each image layer of a frame of image, an encoder in a system on chip (or a chip-level system) (SOC) needs to read image data (for example, an original image or a reconstructed image of the image layer) required for encoding from an off-chip memory of the SOC, and/or write image data (for example, an encoded bitstream of the image layer or the reconstructed image of the image layer) obtained during encoding into the off-chip memory.

However, as a quantity of image layers increases, the encoder needs to frequently access the off-chip memory, and an access bandwidth increases accordingly. In this way, costs and power consumption of accessing the off-chip memory by the encoder are relatively high. Similarly, because a process performed by the decoder is the reverse of the process performed by the encoder, the decoder also has similar problems as the encoder.

SUMMARY

Embodiments of this application provide an image encoding and decoding method and apparatus, to reduce costs and power consumption of accessing an off-chip memory by an encoder and a decoder.

According to a first aspect, this application provides an image encoding method. The method may be applied to an image encoding apparatus. The image encoding apparatus may include a system on chip SOC and an off-chip memory. The SOC may include an encoder, an on-chip memory, and a communication interface. The encoder, the on-chip memory, and the communication interface are coupled to each other. The off-chip memory is located on an outer side of the SOC, and the off-chip memory is coupled to the communication interface. The method may include: The encoder reads a first sub-image of a first frame of image from a first memory, and stores the first sub-image in a second memory. The first memory is the off-chip memory, and the second memory is the on-chip memory. The first frame of image includes a plurality of sub-images, and the plurality of sub-images include the first sub-image. The encoder reads the first sub-image from the on-chip memory. The encoder encodes a base layer of the first sub-image based on the first sub-image, to obtain a bitstream of the base layer of the first sub-image and a first reconstructed image. The first reconstructed image is a reconstructed image of the base layer of the first sub-image. The encoder writes the first reconstructed image into the on-chip memory. The encoder reads the first reconstructed image and the first sub-image from the on-chip memory. The encoder encodes a first enhancement layer of the first sub-image based on the first reconstructed image and the first sub-image, to obtain a bitstream of the first enhancement layer of the first sub-image and a second reconstructed image. The second reconstructed image is a reconstructed image of the first enhancement layer of the first sub-image, and image quality of the enhancement layer is higher than image quality of the base layer.

Optionally, the first memory may be a dynamic random access memory (DRAM), and the second memory may be a static random access memory (SRAM).

Optionally, the first frame of image may be any frame in a video frame sequence. This is not limited in embodiments of this application.

Optionally, the first sub-image may be any one of the plurality of sub-images. This is not limited in embodiments of this application.

Optionally, the sub-image may be, but is not limited to, a block, a macro block (macro block, MB), a largest coding unit (LCU), or another block-level image in a frame of image. This is not limited in embodiments of this application. The block-level image herein refers to an image that does not completely comply with a standard size specified for a block, a macro block, or a largest coding unit, but whose size difference with the standard size of the block, the macro block, or the largest coding unit is less than a preset size threshold.

In an existing solution, before encoding each image layer of a to-be-encoded image, the encoder needs to read the to-be-encoded image from the off-chip memory and store the to-be-encoded image in the on-chip memory, and then read the to-be-encoded image from the on-chip memory for encoding. In addition, for any two adjacent image layers (that is, adjacent image quality) of the to-be-encoded image, the encoder writes a reconstructed image of a lower image layer (that is, lower image quality) into the off-chip memory. Correspondingly, the encoder needs to read the reconstructed image of the lower image layer from the off-chip memory and store the reconstructed image in the on-chip memory, and then read the reconstructed image of the lower image layer from the on-chip memory to encode a higher (that is, higher image quality) image layer.

In other words, in the existing solution, the encoder needs to frequently access the off-chip memory to obtain image data required for encoding and/or store image data obtained by encoding. As a quantity of image layers increases, times of reading and writing the off-chip memory by the encoder and an amount of read and write data increase significantly. In addition, because the off-chip memory generally has features of a low read and write speed and high power consumption, costs and power consumption of accessing the off-chip memory and the on-chip memory by the encoder in the existing solution are relatively high.

However, in this application, only when obtaining a to-be-encoded sub-image for the first time, the encoder needs to read the sub-image from the off-chip memory once and store the sub-image in the on-chip memory. In a subsequent process of encoding the plurality of image layers of the sub-image, the sub-image is read from the on-chip memory only for encoding. In addition, for any two adjacent image layers, the encoder writes a reconstructed image of a lower (that is, image quality is lower) image layer into the on-chip memory. Correspondingly, the encoder may read only the reconstructed image of the lower image layer from the on-chip memory to encode a higher (that is, image quality is higher) image layer. It can be seen that by using the image encoding method provided in this application, the times of reading and writing the off-chip memory and the on-chip memory by the encoder and the amount of read and write data can be reduced. In addition, because the on-chip memory generally has features of a high read and write speed and low power consumption, the image encoding method provided in this application can reduce costs and power consumption of accessing the off-chip memory and the on-chip memory by the encoder.

Optionally, a coding manner of the base layer of the first sub-image may be intra-frame coding or inter-frame coding. This is not limited in this application.

In a possible implementation, if the first frame of image is the first frame of image in the video sequence, that the encoder encodes a base layer of the first sub-image based on the first sub-image may include: encoding the base layer of the first sub-image in an intra-frame coding manner based on the first sub-image and an intra-frame reference image.

Optionally, a manner of obtaining the intra-frame reference image is not limited in this application. For example, the intra-frame reference image may be obtained with reference to the related art.

In another possible implementation, if the first frame of image is not the first frame of image in the video sequence, that the encoder encodes a base layer of the first sub-image based on the first sub-image may include: encoding the base layer of the first sub-image in an inter-frame coding manner based on the first sub-image and an inter-frame reference image.

Optionally, a manner of obtaining the inter-frame reference image is not limited in this application. For example, the inter-frame reference image may be obtained with reference to the related art.

In a possible implementation, the encoder may directly write the first reconstructed image into the on-chip memory. In other words, the first reconstructed image is an image that is not processed by using loop filtering.

In the existing solution, a reconstructed image of each image layer needs to be processed by using loop filtering, and then written into an off-chip memory, to improve image quality. However, although image quality can be improved through processing by using loop filtering, loop filtering processing increases a data amount of stored images, and a reconstructed image of each image needs to be read from the off-chip memory in subsequent use. In this way, a bandwidth requirement of the encoder for accessing an off-chip memory is increased, causing an increase in a time of image encoding, thereby reducing data transmission efficiency.

However, in this application, the reconstructed image (for example, the first reconstructed image) of each image layer is directly stored in the on-chip memory without loop filtering processing, so that the first reconstructed image can be stored in the on-chip memory with a relatively small data amount, and the reconstructed images of the images can be directly read from the on-chip memory in subsequent use. In this way, a bandwidth requirement of the encoder for accessing an external memory can be reduced, to reduce a time of image encoding, thereby improving data transmission efficiency.

In a possible implementation, the encoder may encode the enhancement layer of the first sub-image based on the first reconstructed image and the first sub-image in an inter-layer coding scheme. In other words, the first reconstructed image is a reference image of inter-layer coding (from the base layer to the enhancement layer).

Optionally, after the second reconstructed image is obtained, the method further includes: The encoder writes the second reconstructed image into the second memory.

Optionally, a storage position of the second reconstructed image in the on-chip memory is not limited in this application.

In a possible implementation, the on-chip memory may include a storage space a and a storage space b. The storage space a and the storage space b do not overlap. In a process of scalable encoding of a same sub-image, the storage space a is configured to store the first sub-image, and the storage space b is configured to store a reconstructed image of each image layer in a reusing manner. In this way, more data can be stored through fixed storage space, thereby improving utilization of storage space of the on-chip memory and reducing costs of the on-chip memory.

In another possible implementation, the on-chip memory may include a plurality of storage spaces (for example, including a storage space a, a storage space b, and a storage space c). The plurality of storage spaces do not overlap with each other. In a process of scalable encoding of a same sub-image, different storage spaces are configured to store different images. In this way, complexity of data read and write can be reduced, thereby improving data transmission efficiency.

Optionally, the foregoing steps are described by using only the encoding of the base layer and the encoding of the first enhancement layer of the first sub-image as an example, but this application is not limited thereto. Optionally, the image encoding apparatus may also encode another image layer (an image layer with higher image quality) by using a similar method. This is not limited in embodiments of this application.

In a possible implementation, the encoder may read the second reconstructed image and the first sub-image from the second memory; encode a second enhancement layer of the first sub-image based on the second reconstructed image and the first sub-image, to obtain a bitstream of the second enhancement layer of the first sub-image and a third reconstructed image. The third reconstructed image is a reconstructed image of the second enhancement layer of the first sub-image, and image quality of the second enhancement layer is higher than image quality of the first enhancement layer; and write the third reconstructed image into the second memory, and overwrite the second reconstructed image with the third reconstructed image.

In other words, a reconstructed image of each image layer reuses the fixed storage space in the on-chip memory. In this way, more data can be stored through the fixed storage space, thereby improving utilization of the storage space of the on-chip memory and reducing costs of the on-chip memory.

Through the foregoing description, encoding of the plurality of image layers (such as the base layer, the first enhancement layer, and the second enhancement layer) of the first sub-image can be completed. Further, the encoder may use a similar method to encode a plurality of image layers of other sub-images in the plurality of sub-images. Details are not described herein again.

In a possible implementation, if the plurality of sub-images further include a second sub-image, and an encoding order of the second sub-image is adjacent to an encoding order of the first sub-image, the method may further include: after encoding the plurality of image layers of the first sub-image is completed, encoding a plurality of image layers of the second sub-image, where the plurality of image layers include the base layer and the first enhancement layer.

In other words, scalable encoding of the plurality of sub-images is performed in a serial manner. In this way, scalable encoding of all the sub-images can be sequentially completed by one encoder, and costs of the encoder can be reduced.

In another possible implementation, if the plurality of sub-images further include the second sub-image, and the encoding order of the second sub-image is adjacent to the encoding order of the first sub-image, the method may further include: encoding a base layer of the second sub-image while encoding the first enhancement layer of the first sub-image.

In other words, scalable encoding of the plurality of sub-images is performed in a parallel manner. In this way, a plurality of encoders (for example, the encoder may include a plurality of sub-encoders) need to separately complete scalable encoding of one sub-image, to implement parallel scalable encoding of the plurality of sub-images. In this way, an encoding time can be reduced.

Optionally, the first memory may include a plurality of storage spaces. Different storage spaces are configured to store bitstreams of different image layers. The method further includes: The encoder writes the bitstreams of the different image layers into a storage space in the first memory corresponding to each image layer.

In a possible implementation, for example, the plurality of image layers of the first sub-image include a base layer and a first enhancement layer. The first memory may include a first storage space and a second storage space. The first storage space is configured to store bitstreams of base layers, and the second storage space is configured to store bitstreams of first enhancement layers. After the bitstream of the base layer of the first sub-image is obtained, the encoder may write the bitstream of the base layer of the first sub-image into the first storage space. After the bitstream of the first enhancement layer of the first sub-image is obtained, the bitstream of the first enhancement layer of the first sub-image is written into the second storage space.

Similarly, after the bitstream of each image layer of another sub-image in the first frame of image is obtained, the encoder may write the bitstream of each image layer of the other sub-images into a corresponding storage space.

Optionally, storage positions of the bitstreams of the different sub-images in the same storage space of the first memory is not limited in this application. In a possible implementation, the encoder may write bitstreams of adjacent sub-images into adjacent address segments.

Further, each time a quantity of sub-images corresponding to bitstreams of base layers stored in the first storage space reaches a preset first quantity, the encoder reads the bitstreams of the base layers of the first quantity of sub-images and sends the bitstreams to a decoder side. Similarly, each time a quantity of sub-images corresponding to bitstreams of first enhancement layers stored in the second storage space reaches the first quantity, the encoder reads the bitstreams of the first enhancement layers of the first quantity of sub-images and sends the bitstreams to the decoder side.

In a Wi-Fi network, before sending data to the decoder side each time, the encoder side needs to preempt a channel used for transmitting data. However, channel preemption may fail, or a success rate of channel preemption is relatively limited. Therefore, in this application, bitstreams of same image layers of sub-images are sequentially written into an off-chip memory, and are sent to the decoder side after a specific amount of data is accumulated. In this way, a quantity of channel preemption times can be reduced, thereby improving data transmission efficiency.

Optionally, the encoder may alternatively write a reconstructed image of each image layer of the first sub-image into the off-chip memory, to generate an inter-frame reference image of a second frame of image; or write a reconstructed image of each image layer of the first sub-image into the off-chip memory after performing loop filtering processing, to improve image quality. The second frame of image is located after the first frame of image in the time-frequency frame sequence.

According to a second aspect, this application further provides an image decoding method. The method may be applied to an image decoding apparatus. The image decoding apparatus may include a system on chip SOC and an off-chip memory. The SOC may include a decoder, an on-chip memory, and a communication interface. The decoder, the on-chip memory, and the communication interface are coupled to each other. The off-chip memory is located on an outer side of the SOC, and the off-chip memory is coupled to the communication interface. The method may include: The decoder reads bitstreams of a plurality of image layers of a first sub-image of a first frame of image from a first memory, and writes the bitstreams of the plurality of image layers of the first sub-image into a second memory. The first memory is the off-chip memory, and the second memory is the on-chip memory. The first frame of image includes a plurality of sub-images, the plurality of sub-images include the first sub-image, the plurality of image layers include a base layer and a first enhancement layer, and image quality of the first enhancement layer is higher than image quality of the base layer. The decoder reads a bitstream of a base layer of the first sub-image from the second memory. The decoder decodes the bitstream of the base layer of the first sub-image, to obtain a first decoded image. The first decoded image is a decoded image of the base layer of the first sub-image. The decoder writes the first decoded image into the second memory. The decoder reads a bitstream of a first enhancement layer of the first sub-image and the first decoded image from the second memory. The decoder decodes the bitstream of the first enhancement layer of the first sub-image based on the first decoded image, to obtain a second decoded image. The second decoded image is a decoded image of the first enhancement layer of the first sub-image.

Optionally, the first memory may be a DRAM, and the second memory may be an SRAM.

Optionally, the first frame of image may be any frame in a video frame sequence. This is not limited in embodiments of this application.

Optionally, the first sub-image may be any one of the plurality of sub-images. This is not limited in embodiments of this application.

Optionally, the sub-image may be, but is not limited to, a block, an MB, an LCU, or another block-level image in a frame of image. This is not limited in embodiments of this application. The block-level image herein refers to an image that does not completely comply with a standard size specified for a block, a macro block, or a largest coding unit, but whose size difference with the standard size of the block, the macro block, or the largest coding unit is less than a preset size threshold.

In an existing solution, for decoded images of any two adjacent image layers (that is, adjacent image quality) of a to-be-decoded image, the decoder writes a decoded image of a lower image layer (that is, lower image quality) obtained by decoding into the off-chip memory. Correspondingly, the decoder needs to read the decoded image of the lower image layer from the off-chip memory and store the decoded image in the on-chip memory, and then read the decoded image of the lower image layer from the on-chip memory to decode a bitstream of a higher (that is, higher image quality) image layer.

In other words, in the existing solution, the decoder needs to frequently access the off-chip memory to obtain a decoded image of each image layer required for decoding. As the quantity of image layers increases, times of reading and writing the off-chip memory by the decoder and an amount of read and write data increase significantly. In addition, because the off-chip memory generally has features of a low read and write speed and high power consumption, costs and power consumption of accessing the off-chip memory and the on-chip memory by the decoder in the existing solution are relatively high.

However, in this application, for any two adjacent image layers of the to-be-decoded sub-image, the decoder writes a decoded image of a lower (that is, lower image quality) image layer obtained by decoding into the on-chip memory. Correspondingly, the decoder may read only the decoded image of the lower image layer from the on-chip memory to decode a bitstream of a higher (that is, higher image quality) image layer. It can be seen that, by using the image decoding method provided in this application, the times of reading and writing the off-chip memory and the on-chip memory by the decoder and the amount of read and write data can be reduced. In addition, because the on-chip memory generally has features of a high read and write speed and low power consumption, the image decoding method provided in this application can reduce costs and power consumption of accessing the off-chip memory and the on-chip memory by the decoder.

In a possible implementation, the decoder may directly write the first decoded image into the on-chip memory. In other words, the first decoded image is an image that is not processed by using loop filtering.

In the existing solution, the decoded image of each image layer needs to be processed by using loop filtering, and then written into the off-chip memory, to improve image quality. However, although image quality can be improved through processing by using loop filtering, loop filtering processing increases a data amount of stored images, and the decoded image of each image needs to be read from the off-chip memory in subsequent use. In this way, a bandwidth requirement of the decoder for accessing an off-chip memory is increased, causing an increase in a time of image decoding, thereby reducing data transmission efficiency.

However, in this application, a decoded image (for example, the first decoded image) of each image layer is directly stored in the on-chip memory without loop filtering processing, so that the first decoded image can be stored in the on-chip memory with a relatively small data amount, and the decoded images of the images can be directly read from the on-chip memory in subsequent use. In this way, a bandwidth requirement of the decoder for accessing an external memory can be reduced, to reduce a time of image decoding, thereby improving data transmission efficiency.

Optionally, after the second decoded image is obtained, the method further includes: The decoder writes the second decoded image into the second memory, and overwrites the first decoded image with the second decoded image.

According to the image decoding method provided in this application, a reconstructed image of each image layer is stored in the second memory in a reusing manner. In this way, more data can be stored through fixed storage space, thereby improving utilization of storage space of the on-chip memory and reducing costs of the on-chip memory.

Optionally, the plurality of image layers further include a second enhancement layer, and image quality of the second enhancement layer is higher than image quality of the first enhancement layer. The method further includes: The decoder reads a bitstream of a second enhancement layer of the first sub-image and the second decoded image from the second memory. The decoder decodes the bitstream of the second enhancement layer of the first sub-image based on the second decoded image to obtain a third decoded image. The third decoded image is a decoded image of the second enhancement layer of the first sub-image. The decoder writes the third decoded image into the second memory, and overwrites the second decoded image with the third decoded image.

Optionally, the method further includes: After the second decoded image is obtained, the decoder writes a decoded image of a target image layer of the first sub-image into the first memory. The target image layer is an image layer with highest image quality among the plurality of image layers.

Further, each time a quantity of sub-images corresponding to decoded image stored in the first memory reaches a preset first quantity, the decoder reads the decoded images of the first enhancement layers of the first quantity of sub-images, and sends the decoded images to a display device.

In a Wi-Fi network, before sending data to the display device each time, a decoder side needs to preempt a channel used for transmitting data. However, channel preemption may fail, or a success rate of channel preemption is relatively limited. Therefore, in this application, decoded images of highest (that is, highest image quality) image layers of sub-images are sequentially written into an off-chip memory, and are sent to the display device after a specific amount of data is accumulated, thereby reducing a quantity of channel preemption times, and improving data transmission efficiency.

Optionally, the decoder may decode the bitstreams of the plurality of sub-images in a serial manner or a parallel manner. This is not limited in this application.

In a possible implementation, the plurality of sub-images further include a second sub-image, and a decoding order of the second sub-image is adjacent to a decoding order of the first sub-image. Using a serial manner as an example, the decoder may decode bitstreams of a plurality of image layers of the second sub-image after completing decoding of bitstreams of the plurality of image layers of the first sub-image. In this way, scalable encoding of all the sub-images can be sequentially completed by one encoder, and costs of the encoder can be reduced.

In a possible implementation, the plurality of sub-images further include a second sub-image, and the decoding order of the second sub-image is adjacent to the decoding order of the first sub-image. Using a parallel manner as an example, the decoder may decode the bitstream of a base layer of the second sub-image while decoding the bitstream of the first enhancement layer of the first sub-image. In this way, a plurality of encoders (for example, the encoder may include a plurality of sub-encoders) need to separately complete scalable encoding of one sub-image, to implement parallel scalable encoding of the plurality of sub-images. In this way, an encoding time can be reduced.

Optionally, the decoder may alternatively write the decoded image of each image layer of the first sub-image into the off-chip memory, to generate an inter-frame reference image; or write the decoded image of each image layer of the first sub-image into the off-chip memory after performing loop filtering processing, to improve image quality. The second frame of image is located after the first frame of image in the time-frequency frame sequence.

It should be noted that, because a decoding process is an inverse process of an encoding process, for content and beneficial effects that are not described in detail in the second aspect, refer to related descriptions in the first aspect. Details are not described herein again.

According to a third aspect, this application further provides an image encoding apparatus. The apparatus may include a system on chip SOC and an off-chip memory. The SOC includes an encoder, an on-chip memory, and a communication interface. The encoder, the on-chip memory, and the communication interface are coupled to each other. The off-chip memory is located on an outer side of the SOC, and the off-chip memory is coupled to the communication interface. The encoder is configured to implement the steps in the first aspect or any possible implementation of the first aspect.

According to a fourth aspect, this application further provides an image decoding apparatus. The apparatus may include a system on chip SOC and an off-chip memory. The SOC includes a decoder, an on-chip memory, and a communication interface. The decoder, the on-chip memory, and the communication interface are coupled to each other. The off-chip memory is located on an outer side of the SOC, and the off-chip memory is coupled to the communication interface. The decoder is configured to implement the steps in the second aspect or any possible implementation of the second aspect.

According to a fifth aspect, this application further provides an encoder. The encoder may be used in an image encoding apparatus. The encoder may include a read/write control module and an encoding module. The read/write control module is configured to read a first sub-image of a first frame of image from a first memory, and store the first sub-image in the second memory, where the first memory is an off-chip memory, the second memory is an on-chip memory, the first frame of image includes a plurality of sub-images, and the plurality of sub-images include the first sub-images; read the first sub-image from the second memory. The encoding module is configured to encode a base layer of the first sub-image based on the first sub-image, to obtain a bitstream of the base layer of the first sub-image and a first reconstructed image, where the first reconstructed image is a reconstructed image of the base layer of the first sub-image. The read/write control module is further configured to write the first reconstructed image into the second memory, and read the first reconstructed image and the first sub-image from the second memory. The encoding module is further configured to encode a first enhancement layer of the first sub-image based on the first reconstructed image and the first sub-image to obtain a bitstream of the first enhancement layer of the first sub-image and a second reconstructed image, where the second reconstructed image is a reconstructed image of the first enhancement layer of the first sub-image, and image quality of the first enhancement layer is higher than image quality of the base layer.

In a possible implementation, the encoding module is specifically configured to directly write the second reconstructed image into the second memory.

In a possible implementation, the read/write control module is further configured to, after the second reconstructed image is obtained, write the second reconstructed image into the second memory, and overwrite the first reconstructed image with the second reconstructed image.

In a possible implementation, the read/write control module is further configured to read the second reconstructed image and the first sub-image from the second memory. The encoding module is further configured to encode a second enhancement layer of the first sub-image based on the second reconstructed image and the first sub-image, to obtain a bitstream of the second enhancement layer of the first sub-image and a third reconstructed image. The third reconstructed image is a reconstructed image of the second enhancement layer of the first sub-image, and image quality of the second enhancement layer is higher than image quality of the first enhancement layer. The read/write control module is further configured to write the third reconstructed image into the second memory, and overwrite the second reconstructed image with the third reconstructed image.

In a possible implementation, the first memory includes a first storage space and a second storage space. The first storage space is configured to store bitstreams of base layers, and the second storage space is configured to store bitstreams of a first enhancement layer. The read/write control module is further configured to write the bitstream of the base layer of the first sub-image into the first storage space, and write the bitstream of the first enhancement layer of the first sub-image into the second storage space.

In a possible implementation, the apparatus may further include a sending module. The read/write control module is further configured to, each time a quantity of sub-images corresponding to bitstreams of base layers stored in the first storage space reaches a preset first quantity, read the bitstreams of the base layers of the first quantity of sub-images.

The sending module is configured to send the bitstreams of the base layers of the first quantity of sub-images to the decoder side. The read/write control module is further configured to, each time a quantity of sub-images corresponding to bitstreams of first enhancement layers stored in the second storage space reaches the first quantity, read the bitstreams of the first enhancement layers of the first quantity of sub-images. The sending module is further configured to send the bitstreams of the first enhancement layers of the first quantity of sub-images to the decoder side.

In a possible implementation, the plurality of sub-images further include a second sub-image, and an encoding order of the second sub-image is adjacent to an encoding order of the first sub-image. The encoding module is further configured to, after encoding the plurality of image layers of the first sub-image is completed, encode a plurality of image layers of the second sub-image, where the plurality of image layers include a base layer and a first enhancement layer; or encode a base layer of the second sub-image while encoding the first enhancement layer of the first sub-image.

In a possible implementation, the sub-image is a block, a macro block, or a largest coding unit.

In a possible implementation, the second memory is a static random access memory SRAM, and the first memory is a dynamic random access memory DRAM.

According to a sixth aspect, this application further provides a decoder. The decoder may be used in an image decoding apparatus, and the decoder may include a read/write control module and a decoding module. The read/write control module is configured to read bitstreams of a plurality of image layers of a first sub-image of a first frame of image from a first memory, and write the bitstreams of the plurality of image layers of the first sub-image into a second memory. The first memory is an off-chip memory, the second memory is an on-chip memory, the first frame of image includes a plurality of sub-images, the plurality of sub-images include the first sub-image, the plurality of image layers include a base layer and a first enhancement layer, and image quality of the first enhancement layer is higher than image quality of the base layer. The decoding module is configured to decode a bitstream of a base layer of the first sub-image to obtain a first decoded image. The first decoded image is a decoded image of the base layer of the first sub-image. The read/write control module is further configured to write the first decoded image into the second memory; and read a bitstream of a first enhancement layer of the first sub-image and the first decoded image from the second memory. The decoding module is further configured to decode the bitstream of the first enhancement layer of the first sub-image based on the first decoded image to obtain a second decoded image. The second decoded image is a decoded image of the first enhancement layer of the first sub-image.

In a possible implementation, the read/write control module is specifically configured to directly write the first decoded image into the second memory.

In a possible implementation, the read/write control module is further configured to, after the second decoded image is obtained, write the second decoded image into the second memory, and overwrite the first decoded image with the second decoded image.

In a possible implementation, the plurality of image layers further include a second enhancement layer. Image quality of the second enhancement layer is higher than image quality of the first enhancement layer. The read/write control module is further configured to read a bitstream of a second enhancement layer of the first sub-image and the second decoded image from the second memory. The decoding module is further configured to decode the bitstream of the second enhancement layer of the first sub-image based on the second decoded image to obtain a third decoded image. The third decoded image is a decoded image of the second enhancement layer of the first sub-image. The read/write control module is further configured to write the third decoded image into the second memory, and overwrite the second decoded image with the third decoded image.

In a possible implementation, the read/write control module is further configured to write a decoded image of a target image layer of the first sub-image into the first memory. The target image layer is an image layer with highest image quality among the plurality of image layers.

In a possible implementation, the apparatus may further include a sending module. The read/write control module is further configured to, each time a quantity of sub-images corresponding to the decoded image stored in the first memory reaches a preset first quantity, read the decoded images of the first enhancement layers of the first quantity of sub-images. The sending module is configured to send the decoded images of the first enhancement layers of the first quantity of sub-images to a display device.

In a possible implementation, the plurality of sub-images further include a second sub-image, and a decoding order of the second sub-image is adjacent to a decoding order of the first sub-image, and the decoding module is further configured to, after decoding of bitstreams of the plurality of image layers of the first sub-image is completed, decode bitstreams of a plurality of image layers of the second sub-image; or the decoding module is further configured to decode a bitstream of a base layer of the second sub-image while decoding the bitstream of the first enhancement layer of the first sub-image.

In a possible implementation, the sub-image is a block, a macro block, or a largest coding unit.

In a possible implementation, the second memory is a static random access memory SRAM, and the first memory is a dynamic random access memory DRAM.

According to a seventh aspect, this application further provides a computer storage medium. The computer storage medium stores a computer program, and when the computer program is run by a processor, the method according to the first aspect or any possible implementation of the first aspect and/or the method according to the second aspect or any possible implementation of the second aspect are implemented.

According to an eighth aspect, this application further provides a computer program product. When the computer program product is run on a processor, the method according to the first aspect or any possible implementation of the first aspect, and/or the method according to the second aspect or any possible implementation of the second aspect are implemented.

The image encoding apparatus, the image decoding apparatus, the encoder, the decoder, the computer-readable storage medium, or the computer program product provided in embodiments of this application are all configured to perform the corresponding method provided above. Therefore, for beneficial effects that can be achieved, refer to beneficial effects in the corresponding method provided above. Details are not described herein again.

DETAILED DESCRIPTION OF ILLUSTRATIVE EMBODIMENTS

Figure 1:
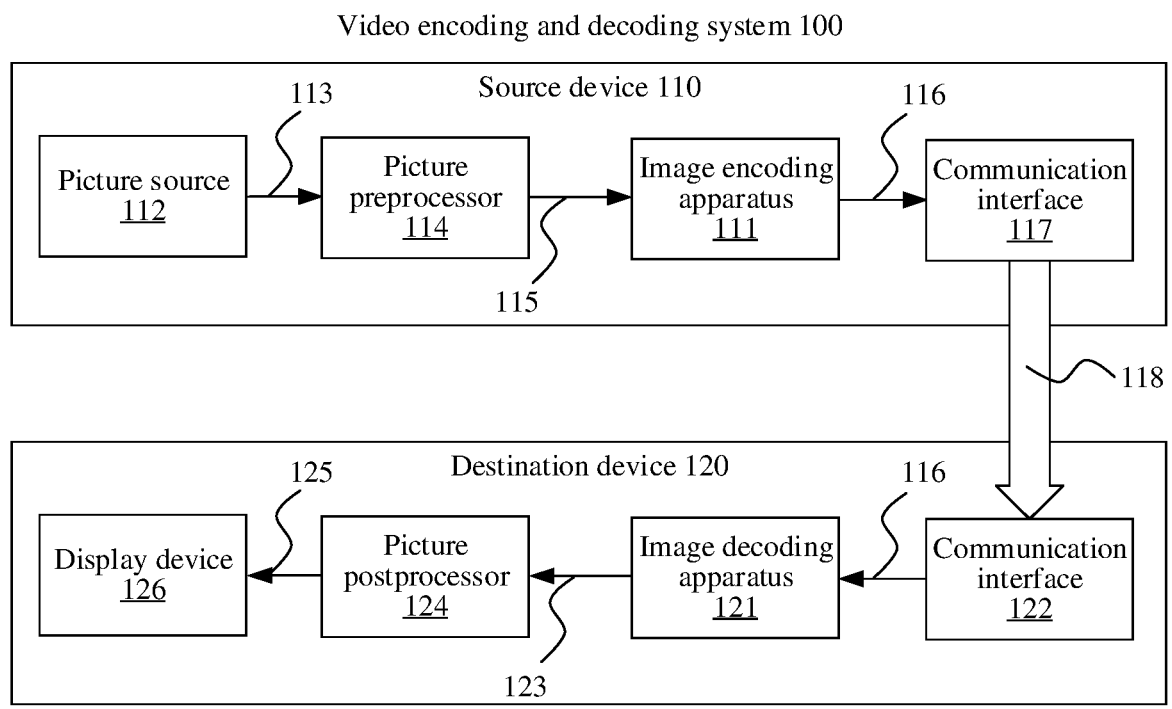
FIG. 1 is a schematic block diagram of a video encoding and decoding system 100 according to an embodiment of this application.

The following describes technical solutions of this application with reference to accompanying drawings.

In the specification, embodiments, claims, and accompanying drawings of this application, terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may represent: a, b, c, a and b, a and c, b and c, or a, b, and c, where a, b, and c may be singular or plural.

The technical solutions in embodiments of this application may not only be applied to an existing video coding standard (for example, a H.264/Advanced Video Coding (AVC) or H.265/High Efficiency Video Coding (HEVC) standard), but also be applied to a future video coding standard (for example, a H.266/Versatile Video Coding (VVC) standard). Terms used in embodiments of this application are only used to explain specific embodiments of this application, but are not intended to limit this application. The following first briefly describes some related concepts in embodiments of this application.

In the field of video encoding, the terms "picture", "frame", or "image" may be used as synonyms. Video encoding is performed on a source side, and usually includes processing (for example, by compressing) an original video picture to reduce a data amount for representing the video picture, for more efficient storage and/or transmission. Video decoding is performed on a destination side, and usually includes inverse processing relative to an encoder, to reconstruct video pictures. "Coding" of a video picture in embodiments should be understood as "encoding" or "decoding" of a video sequence. A combination of an encoding part and a decoding part is also referred to as encoding and decoding.

The following first describes a system architecture applied in embodiments of this application.

Refer to FIG. 1. FIG. 1 is a schematic block diagram of a video encoding and decoding system 100 configured to implement an embodiment of this application. As shown in FIG. 1, the video encoding and decoding system 100 may include a source device 110 and a destination device 120. The source device 110 generates encoded video data, and therefore, the source device 110 may be referred to as a video encoding device or an encoder side. The destination device 120 may decode the encoded video data generated by the source device 110. Therefore, the destination device 120 may be referred to as a video decoding device or a decoder side.

In a possible implementation, both the source device 110 and the destination device 120 may include at least one processor and at least one memory coupled to the at least one processor.

Optionally, the processor may include, but is not limited to, a general-purpose processor, a digital signal processor (DSP), an application-specific integrated circuit (ASIC), a field programmable gate array (FPGA), or another programmable logic device, a discrete gate or a transistor logic device, or a discrete hardware component. The processor may implement or perform the methods and steps that are disclosed in embodiments of this application. The general-purpose processor may be a microprocessor, or the processor may be any conventional processor or the like.

Optionally, the memory may include, but is not limited to, a random access memory (RAM), a static random access memory (SRAM), a dynamic random access memory (DRAM), a read-only memory (ROM), an electrically erasable programmable read-only memory (EEPROM), a flash memory, or any other medium that may be configured to store required program code in a form of an instruction or a data structure accessible by a computer.

Communication connection between the source device 110 and the destination device 120 may be implemented through a link 118, and the destination device 120 may receive the encoded video data from the source device 110 through the link 118.

Optionally, the link 118 may include one or more media or apparatuses that can move the encoded video data from the source device 110 to the destination device 120.

In a possible implementation, the link 118 may include one or more communication media that enable the source device 110 to directly transmit the encoded video data to the destination device 120 in real time. In this instance, the source device 110 may modulate the encoded video data based on a communication standard (for example, a wireless communication protocol), and may transmit modulated video data to the destination device 120.

Optionally, the one or more communication media may include wireless and/or wired communication media. This is not limited in this application.

For example, the one or more communication media may include a frequency spectrum of radio frequency (RF) or one or more physical transmission lines.

For example, the one or more communication media may form a part of a packet-based network, and the packet-based network may be, for example, a local area network, a wide area network, or a global network (for example, the Internet).

For example, the one or more communication media may include a router, a switch, a base station, or another device that facilitates communication from the source device 110 to the destination device 120.

The source device 110 may include an image encoding apparatus 111. Optionally, the source device 110 may further include a picture source 112, a picture preprocessor 114, and a communication interface 117.

The picture source 112 may include or may be any type of picture capture device, configured to, for example, capture a real-world picture, and/or any type of picture or comment (for screen content encoding, some text on a screen is also considered as a part of a picture or an image to be encoded) generation device.

In a possible implementation, the picture source 112 may include a computer graphics processing unit configured to generate a computer animation picture, or any type of device configured to obtain and/or provide a real-world picture, a computer animation picture (for example, screen content and a virtual reality (virtual reality, VR) picture), and/or any combination thereof (for example, an augmented reality (augmented reality, AR) picture).

In another possible implementation, the picture source 112 may include a camera configured to capture a picture, or a memory configured to store a picture, or any type of (internal or external) interface for storing a previously captured or generated picture and/or obtaining or receiving a picture.

For example, when the picture source 112 is a camera, the picture source 112 may be a local camera or an integrated camera integrated in the source device. When the picture source 112 is a memory, the picture source 112 may be a local memory or an integrated memory integrated in the source device. When the picture source 112 includes an interface, the interface may be an external interface for receiving a picture from an external video source. The external video source is, for example, an external picture capture device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

The picture preprocessor 114 is configured to receive original picture data 113 and perform preprocessing on the original picture data 113, to obtain a preprocessed picture 115 or preprocessed picture data 115.

Optionally, the preprocessing performed by the picture preprocessor 114 may include refining, color format conversion, color correction, or noise reduction.

It should be noted that performing preprocessing on the picture data 113 is not a necessary processing process in this application, and this is not specifically limited in this application.

The image encoding apparatus 111 (or referred to as a video encoding apparatus 111) is configured to receive the preprocessed picture data 115, and process the preprocessed picture data 115 by using a related prediction mode (for example, a prediction mode in each embodiment of this specification), to provide the encoded picture data 116. In some embodiments, the image encoding apparatus 111 may be configured to perform embodiments described below, to implement application of the image encoding method on an encoding side described in this application.

The communication interface 117 may be configured to receive the encoded picture data 116, and transmit the encoded picture data 116 to the destination device 120 or any other device (for example, a memory) through the link 118 for storage or direct reconstruction. The any other device may be any device used for decoding or storage. The communication interface 117 may be configured to encapsulate the encoded picture data 116 into a proper format, for example, a data packet, for transmission on the link 118.

The destination device 120 includes an image decoding apparatus 121. Optionally, the destination device 120 may further include a communication interface 122, a picture postprocessor 124, and a display device 125, which are separately described as follows.

The communication interface 122 may be configured to receive the encoded picture data 116 from the source device 110 or any other source. The any other source is, for example, a storage device, and the storage device is, for example, an encoded picture data storage device. The communication interface 122 may be configured to transmit or receive the encoded picture data 116 through the link 118 between the source device 110 and the destination device 120 or through any type of network. The link 118 is, for example, a direct wired or wireless connection. The any type of network is, for example, a wired or wireless network or any combination thereof, or any type of private or public network, or any combination thereof. The communication interface 122 may be, for example, configured to decapsulate a data packet transmitted by the communication interface 117 to obtain the encoded picture data 116.

Both the communication interface 122 and the communication interface 117 may be configured as unidirectional communication interfaces or bidirectional communication interfaces, and may be configured to, for example, send and receive messages to establish a connection, and acknowledge and exchange any other information related to a communication link and/or data transmission such as encoded picture data transmission.

The image decoding apparatus 121 (or referred to as a video decoding apparatus 121) is configured to receive the encoded picture data 116, and provide decoded picture data 123 or a decoded picture 123. In some embodiments, the image decoding apparatus 121 may be configured to perform embodiments described below, to implement application of the image decoding method on a decoding side described in this application.

The picture postprocessor 124 is configured to postprocess the decoded picture data 123 (also referred to as reconstructed picture data), to obtain postprocessed picture data 125.

Optionally, the postprocessing performed by the picture postprocessor 124 may include color format conversion, color correction, refining or resampling, or any other processing, or may be configured to transmit the postprocessed picture data 125 to the display device 126.

It should be noted that performing postprocessing on the decoded picture data 123 (also referred to as reconstructed picture data) is not a necessary processing process in this application. This is not specifically limited in this application.

The display device 126 is configured to receive the postprocessed picture data 125 to display a picture, for example, to a user or a viewer.

In a possible implementation, the display device 126 may be or may include any type of display configured to present the reconstructed picture.

For example, the display device 126 may be an integrated or external display or monitor.

Optionally, the display may include a liquid crystal display (LCD), an organic light-emitting diode (OLED) display, a plasma display, a projector, a micro LED display, a liquid crystal on silicon (LCoS), a digital light processor (DLP), or any other type of display.

Optionally, the source device 110 and the destination device 120 may be various devices that provide video/data connectivity for a user. This is not limited in this application.

For example, the source device 110 and the destination device 120 may include any one of the following devices, including any type of handheld or stationary device, for example, a notebook or laptop computer, a mobile phone, a smartphone, a tablet or tablet computer, a wearable device, a camera, a desktop computer, a set-top box, a television, a camera, an in-vehicle device, a display device, a digital media player, a video game console, a video streaming transmission device (for example, a content service server or a content delivery server), a broadcast receiver device, and a broadcast transmitter device, you may not use or use any type of operating system.

In a possible implementation, the video encoding and decoding system 100 may be applied to a scenario of short-range wireless projection. The short-range wireless projection is a technology in which video data generated by a mobile terminal with a strong processing capability is encoded and compressed, and sent, in a wireless manner, to a device with a weak processing capability but good display effect for display.

For example, the source device 110 is a mobile phone, and the destination device 120 is VR glasses. The mobile phone may project a rendered game picture to a display interface of the VR glasses.

For example, the source device 110 may be a notebook computer, the destination device 120 is a television, and the notebook computer may project a television picture to a display interface of the television.

It should be noted that the source device 110 and the destination device 120 are shown as separate devices in FIG. 1. However, this application is not limited thereto. Optionally, the source device 110 and the destination device 120 may be (or integrated into) a same device, that is, the device may include both functionality corresponding to the source device 110 and functionality corresponding to the destination device 120. In such embodiments, the functionality corresponding to the source device 110 and the functionality corresponding to the destination device 120 may be implemented by using same hardware and/or software, separate hardware and/or software, or any combination thereof.

For example, the source device 110 and the destination device 120 are integrated in the mobile phone, and the mobile phone may project a rendered game picture to a display interface of the mobile phone.

It should be noted that the image encoding apparatus 111, the picture source 112, the picture preprocessor 114, and the communication interface 117 are shown as independent components in FIG. 1. However, this application is not limited thereto. Optionally, the picture source 112, the picture preprocessor 114, and/or the communication interface 117 may be integrated into the image encoding apparatus 111, or the image encoding apparatus 111 may further have functionality of the picture source 112, the picture preprocessor 114, and/or the communication interface 117.

Similarly, the image decoding apparatus 121, the communication interface 122, the picture postprocessor 124, and the display device 126 are shown as independent components in FIG. 1. However, this application is not limited thereto. Optionally, the communication interface 122 and/or the picture postprocessor 124 may be integrated into the image decoding apparatus 121, or the image decoding apparatus 121 may further have functionality of the communication interface 122 and/or the picture postprocessor 124.

In some cases, the video encoding and decoding system 100 shown in FIG. 1 is merely an example and the technologies in this application are applicable to video encoding settings (for example, video encoding or video decoding) that do not necessarily include any data communication between the source device 110 and the destination device 120. In another instance, data may be retrieved from a local memory, streamed over a network, or the like. A video encoding device may encode data and store data in the memory, and/or a video decoding device may retrieve and decode data from the memory. In some instances, encoding and decoding are performed by devices that do not communicate with each other but simply encode data to the memory and/or retrieve data from the memory and decode the data.

Optionally, the foregoing video encoding and decoding system 100 is applicable to, but is not limited to, the H.264 Scalable Video Coding (SVC) protocol, the H.265 Scalable Video Coding (SHVC) protocol, or a next generation video standard protocol (such as H.266).

Figure 2:
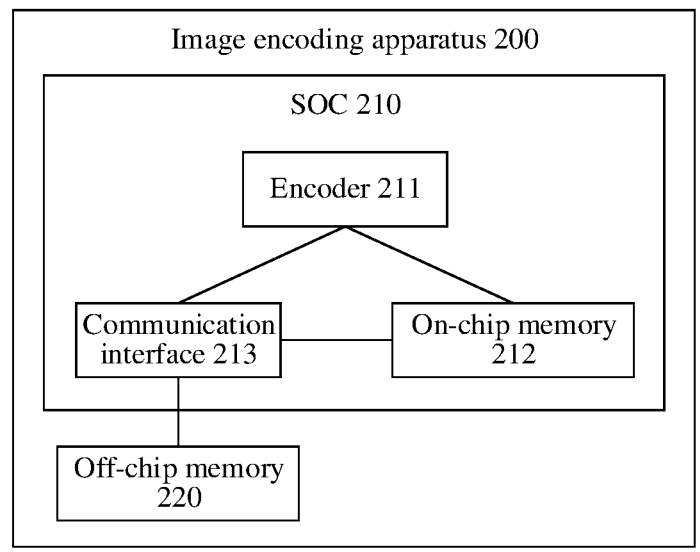
FIG. 2 is a schematic block diagram of an image encoding apparatus 200 according to an embodiment of this application.

Refer to FIG. 2. FIG. 2 is a schematic block diagram of an image encoding apparatus 200 according to an embodiment of this application. The image encoding apparatus 200 may be the image encoding apparatus 111 in the video encoding and decoding system 100. As shown in FIG. 2, the image encoding apparatus 200 may include a system-on-chip (or a chip-level system) (SOC) 210 and an off-chip memory 220. The SOC 210 may include an encoder 211, an on-chip memory 212, and a communication interface 213. The encoder 211, the on-chip memory 212, and the communication interface 213 are coupled to each other, and the communication interface 213 is coupled to the off-chip memory 220.

The encoder 211 is configured to execute a computer program or instructions, so that the image encoding apparatus 200 implements the image encoding method described in embodiments of this application.

Optionally, the encoder 211 includes one or more processing units. The processing unit includes, but is not limited to, a central processing unit (CPU), a general-purpose processor, a digital signal processor (DSP), an application-specific integrated circuit (ASIC), a field programmable gate array (FPGA), a discrete gate or a transistor logic device, a discrete hardware component, or the like. The general-purpose processor may be a microprocessor, a microcontroller, any conventional processor, or the like.

It should be noted that the on-chip memory 212 is located inside the SOC 210, and has features of a high read and write speed, a small capacity, and low power consumption. The off-chip memory 220 is disposed outside or on an outer side of the SOC 210 (that is, the off-chip memory 220 does not belong to the SOC 210), and has features of a low read and write speed, a large capacity, and high power consumption.

In a possible implementation, the on-chip memory may be a static random access memory (SRAM), and the off-chip memory may be a dynamic random access memory (DRAM). For example, the SRAM may be a cache, and the DRAM may be an internal memory.

The off-chip memory 220 is configured to store a to-be-encoded image (for example, picture data 115 in FIG. 1), and is further configured to store bitstreams of a plurality of image layers (for example, picture data 116 in FIG. 1) obtained after the to-be-encoded image is scalably encoded by the encoder 211.

The encoder 211 may read the to-be-encoded image from the off-chip memory 220 through the communication interface 213, and store the to-be-encoded image in the on-chip memory 212, or may write the bitstreams of the plurality of image layers obtained by encoding into the off-chip memory 220 through the communication interface 213.

The on-chip memory 212 is configured to store the to-be-encoded image, and is further configured to store reconstructed images of the plurality of image layers.

The encoder 211 may further read the to-be-encoded image and a reconstructed image of each image layer of the to-be-encoded image from the on-chip memory 212.

It should be noted that FIG. 2 merely shows a simplified design of the image encoding apparatus 200. In actual application, the image encoding apparatus 200 may further include other necessary elements separately, including, but not limited to, any quantity of communication interfaces, processors, controllers, memories, and the like, and all image encoding apparatuses that can implement this application shall fall within the protection scope of this application.

Figure 3:
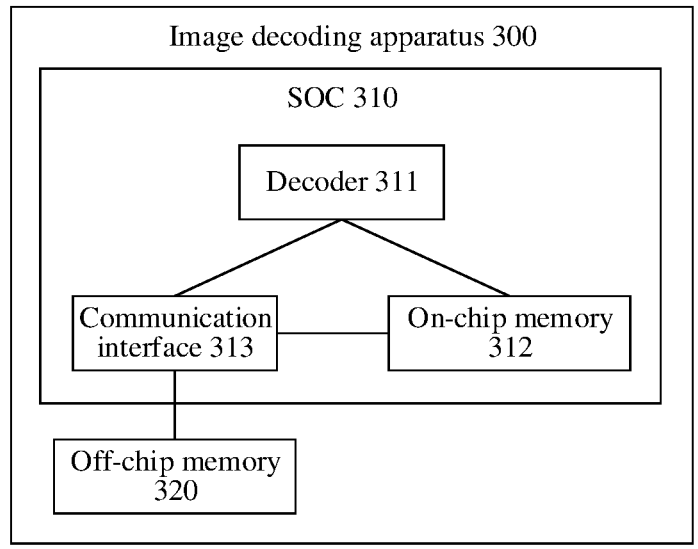
FIG. 3 is a schematic block diagram of an image decoding apparatus 300 according to an embodiment of this application.

Refer to FIG. 3. FIG. 3 is a schematic block diagram of an image decoding apparatus 300 according to an embodiment of this application. The image decoding apparatus 300 may be the image decoding apparatus 121 in the video encoding and decoding system 100. As shown in FIG. 3, the image decoding apparatus 300 may include an SOC 310 and an off-chip memory 320. The SOC 310 may include a decoder 311, an on-chip memory 312, and a communication interface 313. The decoder 311, the on-chip memory 312, and the communication interface 313 are coupled to each other, and the communication interface 313 is coupled to the off-chip memory 320.

The decoder 311 is configured to execute a computer program or instructions, so that the image decoding apparatus 300 implements the image decoding method described in embodiments of this application.

Optionally, the decoder 311 includes one or more processing units, and the processing unit includes, but is not limited to, a CPU, a general-purpose processor, a DSP, an ASIC, an FPGA, a discrete gate or a transistor logic device, a discrete hardware component, or the like. The general-purpose processor may be a microprocessor, a microcontroller, any conventional processor, or the like.

It should be noted that the on-chip memory 312 is located inside the SOC 310, and has features of a high read and write speed, a small capacity, and low power consumption. The off-chip memory 320 is disposed outside or on an outer side of the SOC 310 (that is, the off-chip memory 320 does not belong to the SOC 310), and has features of a low read and write speed, a large capacity, and high power consumption.

In a possible implementation, the on-chip memory may be an SRAM, and the off-chip memory may be a DRAM. For example, the SRAM may be a cache, and the DRAM may be an internal memory.

The off-chip memory 320 is configured to store bitstreams of a plurality of image layers (for example, picture data 116 in FIG. 1), and is further configured to store decoded images of the plurality of image layers (for example, picture data 123 in FIG. 1) obtained after the bitstreams of the plurality of image layers are decoded by the decoder 311.

The decoder 311 may read the bitstreams of the plurality of image layers from the off-chip memory 320 through the communication interface 313, and store the bitstreams of the plurality of image layers in the on-chip memory 312, or may write the decoded images of the plurality of image layers obtained by decoding into the off-chip memory 320 through the communication interface 313.

The on-chip memory 312 is configured to store bitstreams of the plurality of image layers, and is further configured to store decoded images of the plurality of image layers.

The decoder 311 may further read the bitstreams of the plurality of image layers and the decoded images of the plurality of image layers from the on-chip memory 312.

It should be noted that FIG. 3 merely shows a simplified design of the image decoding apparatus 300. In actual application, the image decoding apparatus 300 may further include other necessary elements separately, including, but not limited to, any quantity of communication interfaces, processors, controllers, memories, and the like, and all image decoding apparatuses that can implement this application shall fall within the protection scope of this application.

An image encoding method and an image decoding method provided in embodiments of this application are described below in detail.

Figure 4:
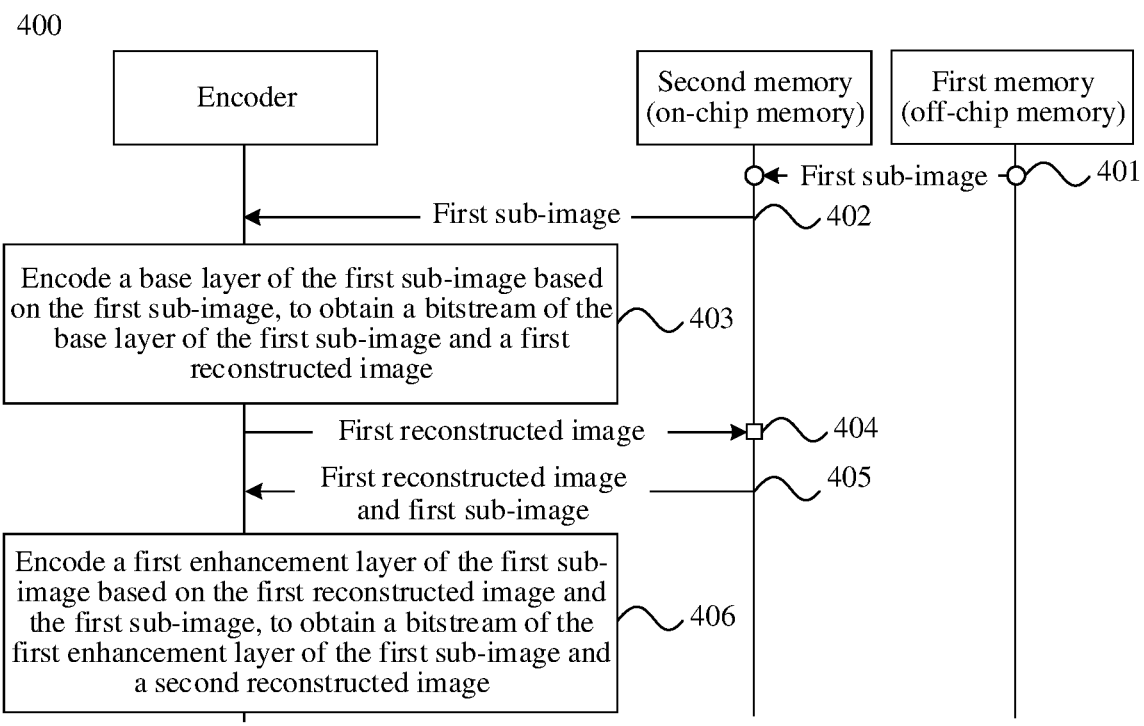
FIG. 4 is a schematic flowchart of an image encoding method 400 according to an embodiment of this application.

FIG. 4 is a schematic flowchart of an image encoding method 400 according to an embodiment of this application. The method 400 may be applied to the image encoding apparatus 200. The method 400 is described as a series of steps or operations. However, it should be understood that the method 400 may be performed in various orders and/or simultaneously, and is not limited to a performing order shown in FIG. 4. As shown in FIG. 4, the method 400 may include the following steps.

Step 401: An encoder reads a first sub-image of a first frame of image from a first memory, and stores the first sub-image in a second memory. The first memory is an off-chip memory, the second memory is an on-chip memory, the first frame of image includes a plurality of sub-images, and the plurality of sub-images include the first sub-image.

In other words, the encoder writes the first sub-image into the second memory.

It should be noted that the encoder and the second memory in step 401 may be located inside the SOC, and the first memory in step 401 may be disposed outside the SOC.

For example, the SOC may be the SOC 210 shown in FIG. 2, the encoder may be the encoder 211 shown in FIG. 2, the second memory may be the on-chip memory 212 shown in FIG. 2, and the first memory may be the off-chip memory 220 shown in FIG. 2.

For example, the first memory may be a DRAM, and the second memory may be an SRAM.

Optionally, the first frame of image may be any frame in a video frame sequence. This is not limited in embodiments of this application.

Optionally, the first sub-image may be any one of the plurality of sub-images. This is not limited in embodiments of this application.

Optionally, the sub-image may be, but is not limited to, a block, a macro block (macro block, MB), a largest coding unit (LCU), or another block-level image in a frame of image. This is not limited in embodiments of this application. The block-level image herein refers to an image that does not completely comply with a standard size specified for a block, a macro block, or a largest coding unit, but whose size difference with the standard size of the block, the macro block, or the largest coding unit is less than a preset size threshold.

It should be noted that each sub-image at an encoder side may be divided into a base layer and at least one enhancement layer. The base layer provides basic image quality. The enhancement layer improves the image quality based on the base layer. That is, the image quality of the enhancement layer is higher than the image quality of the base layer. The image quality of the at least one enhancement layer is arranged in ascending order. The "image quality" in this application may include pixel fidelity. Optionally, the "image quality" may further include resolution and/or a frame rate, that is, the image quality of the base layer is the lowest.

Figure 5:
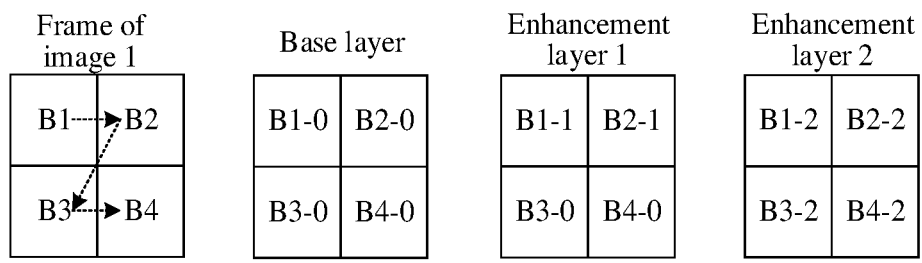
FIG. 5 is a schematic diagram of a frame of image and a plurality of image layers of the frame of image according to an embodiment of this application.

For example, FIG. 5 is a schematic diagram of a frame of image and a plurality of image layers of the frame of image. As shown in FIG. 5, an image 1 includes four sub-images, that is, B1, B2, B3, and B4, and the image 1 is divided into three image layers, that is, a base layer, an enhancement layer 1, and an enhancement layer 2. Using B1 as an example, during performing scalable encoding on B1, the encoder first encodes to obtain a bitstream of a base layer (that is, B1-0) of B1 and a reconstructed image of B1-0, encodes B1 with reference to the reconstructed image of B1-0 to obtain a bitstream of an enhancement layer 1 (that is, B1-1) of B1 and a reconstructed image of B1-1, and then encodes B1 with reference to the reconstructed image of B1-1 to obtain a bitstream of an enhancement layer 2 (that is, B1-2) of B1 and a reconstructed image of B1-2. Therefore, image quality of B1-0 is lower than image quality of B1-1, and image quality of B1-1 is lower than image quality of B1-2. For a relationship between image quality of each image layer of B2, B3, and B4 in FIG. 5, refer to B1. Details are not described herein again. It should be noted that, in this application, performing scalable encoding on a sub-image may also be referred to as performing encoding on a plurality of image layers of the sub-image.

Correspondingly, a larger quantity of image layers received (or decoded) by the decoder side indicates higher quality of an obtained image. When an SVC-encoded bitstream is propagated in a communication network, different modulation and coding schemes (modulation and coding schemes, MCSs) may be used for different image layers. For example, a low-rate MCS is used for a base layer and a low enhancement layer, so that user equipment with a poor channel state can obtain a basic video service. A high-rate MCS is used for a high enhancement layer, so that user equipment with a good channel state can obtain a video service with higher quality and higher resolution.

Step 402: The encoder reads the first sub-image from the on-chip memory.

Step 403: The encoder encodes a base layer of the first sub-image based on the first sub-image, to obtain a bitstream of the base layer of the first sub-image and a first reconstructed image. The first reconstructed image is a reconstructed image of the base layer of the first sub-image.

Optionally, a coding manner of the base layer of the first sub-image may be intra-frame coding or inter-frame coding. This is not limited in this application.

In a possible implementation, if the first frame of image is the first frame of image in the video sequence, step 403 may include: encoding the base layer of the first sub-image in an intra-frame coding manner based on the first sub-image and the intra-frame reference image.

Optionally, a manner of obtaining the intra-frame reference image is not limited in this application. For example, the intra-frame reference image may be obtained with reference to the related art.

In another possible implementation, if the first frame of image is not the first frame of image in the video sequence, step 403 may include: encoding the base layer of the first sub-image in an inter-frame coding manner based on the first sub-image and an inter-frame reference image.

Optionally, a manner of obtaining the inter-frame reference image is not limited in this application. For example, the inter-frame reference image may be obtained with reference to the related art.

Step 404: The encoder writes the first reconstructed image into the on-chip memory.

In step 401, the encoder has written the first sub-image into the on-chip memory, that is, the on-chip memory already stores the first sub-image. Therefore, in step 404, the encoder only needs to write the first reconstructed image into the on-chip memory. In this way, both the first sub-image and the first reconstructed image are stored in the on-chip memory, and can be directly read from the on-chip memory in subsequent use.

It should be noted that the sub-image in this application is a block-level image, and a data amount of the block-level image is far less than a storage space size of the on-chip memory. Therefore, the encoder may write a to-be-encoded sub-image and a reconstructed image of each image layer of the to-be-encoded sub-image into the on-chip memory, and may directly read the to-be-encoded sub-image and the reconstructed image from the on-chip memory in subsequent use.

In a possible implementation, the encoder may directly write the first reconstructed image into the on-chip memory. In other words, the first reconstructed image is an image that is not processed by using loop filtering.

In the existing solution, a reconstructed image of each image layer needs to be processed by using loop filtering, and then written into an off-chip memory, to improve image quality. However, although image quality can be improved through processing by using loop filtering, loop filtering processing increases a data amount of stored images, and reconstructed images of each image needs to be read from the off-chip memory in subsequent use. In this way, a bandwidth requirement of the encoder for accessing an off-chip memory is increased, causing an increase in a time of image encoding, thereby reducing data transmission efficiency.

However, in this application, the reconstructed image (for example, the first reconstructed image) of each image layer is directly stored in the on-chip memory without loop filtering processing, so that the first reconstructed image can be stored in the on-chip memory with a relatively small data amount, and the reconstructed images of the images can be directly read from the on-chip memory in subsequent use. In this way, a bandwidth requirement of the encoder for accessing an external memory can be reduced, to reduce a time of image encoding, thereby improving data transmission efficiency.

Optionally, storage positions of the first sub-image and the first reconstructed image in the on-chip memory are not limited in this application.

For example, the on-chip memory may include a storage space a and a storage space b. The storage space a does not overlap with the storage space b. The first sub-image is written into the storage space a, and the first reconstructed image is written into the storage space b.

Step 405: The encoder reads the first reconstructed image and the first sub-image from the on-chip memory.

It should be noted that, because the first sub-image and the first reconstructed image are both stored in the on-chip memory after step 404, in step 405, the encoder may directly read the first sub-image and the first reconstructed image from the on-chip memory.

In other words, the first sub-image is read from the off-chip memory only once when being used for the first time, and can be directly read from the on-chip memory in subsequent use.

Step 406: The encoder encodes a first enhancement layer of the first sub-image based on the first reconstructed image and the first sub-image, to obtain a bitstream of the first enhancement layer of the first sub-image and a second reconstructed image. The second reconstructed image is a reconstructed image of the first enhancement layer of the first sub-image, and image quality of the enhancement layer is higher than image quality of the base layer.

In a possible implementation, the encoder may encode the enhancement layer of the first sub-image based on the first reconstructed image and the first sub-image in an inter-layer coding scheme. In other words, the first reconstructed image is a reference image of inter-layer coding (from the base layer to the enhancement layer).

Optionally, after the second reconstructed image is obtained in step 406, the method 400 further includes: The encoder writes the second reconstructed image into the second memory.

Optionally, a storage position of the second reconstructed image in the on-chip memory is not limited in this application.

In a possible implementation, the on-chip memory may include a storage space a and a storage space b. The storage space a and the storage space b do not overlap. In a process of scalable encoding of a same sub-image, the storage space a is configured to store the first sub-image, and the storage space b is configured to store a reconstructed image of each image layer in a reusing manner. In this way, more data can be stored through fixed storage space, thereby improving utilization of storage space of the on-chip memory and reducing costs of the on-chip memory.

For example, the first sub-image is written into the storage space a, and the first reconstructed image is written into the storage space b. The second reconstructed image may be written into the storage space b and the first reconstructed image is overwritten.

In another possible implementation, the on-chip memory may include a plurality of storage spaces (for example, including a storage space a, a storage space b, and a storage space c). The plurality of storage spaces do not overlap with each other. In a process of scalable encoding of a same sub-image, different storage spaces are configured to store different images. In this way, complexity of data read and write can be reduced, thereby improving data transmission efficiency.

For example, the first sub-image is written into the storage space a, and the first reconstructed image is written into the storage space b. The second reconstructed image may be written into the storage space c.

Optionally, the encoding of the base layer and the encoding of the first enhancement layer of the first sub-image are only described as an example in step 401 to step 406. However, this application is not limited thereto. Optionally, the image encoding apparatus may also encode another image layer (an image layer with higher image quality) by using a similar method. This is not limited in embodiments of this application.

In a possible implementation, the encoder may read the second reconstructed image and the first sub-image from the second memory; encode a second enhancement layer of the first sub-image based on the second reconstructed image and the first sub-image, to obtain a bitstream of the second enhancement layer of the first sub-image and a third reconstructed image. The third reconstructed image is a reconstructed image of the second enhancement layer of the first sub-image, and image quality of the second enhancement layer is higher than image quality of the first enhancement layer; and write the third reconstructed image into the second memory, and overwrite the second reconstructed image with the third reconstructed image.

In other words, a reconstructed image of each image layer reuses the fixed storage space in the on-chip memory. In this way, more data can be stored through the fixed storage space, thereby improving utilization of the storage space of the on-chip memory and reducing costs of the on-chip memory.

Through the foregoing description, encoding of the plurality of image layers (such as the base layer, the first enhancement layer, and the second enhancement layer) of the first sub-image can be completed. Further, the encoder may use a similar method to encode a plurality of image layers of other sub-images in the plurality of sub-images. Details are not described herein again.

For example, as shown in FIG. 5, the encoder may sequentially read sub-images in the image 1 in an order shown by arrows in FIG. 5, and perform scalable encoding on the read sub-images.

In a possible implementation, if the plurality of sub-images further include a second sub-image, and an encoding order of the second sub-image is adjacent to an encoding order of the first sub-image, the method 400 may further include: after encoding the plurality of image layers of the first sub-image is completed, encoding a plurality of image layers of the second sub-image, where the plurality of image layers include the base layer and the first enhancement layer.

In other words, scalable encoding of the plurality of sub-images is performed in a serial manner. In this way, scalable encoding of all the sub-images can be sequentially completed by one encoder, and costs of the encoder can be reduced.

In another possible implementation, if the plurality of sub-images further include the second sub-image, and the encoding order of the second sub-image is adjacent to the encoding order of the first sub-image, the method 400 may further include: encoding a base layer of the second sub-image while encoding the first enhancement layer of the first sub-image.

In other words, scalable encoding of the plurality of sub-images is performed in a parallel manner. In this way, a plurality of encoders (for example, the encoder may include a plurality of sub-encoders) need to separately complete scalable encoding of one sub-image, to implement parallel scalable encoding of the plurality of sub-images. In this way, an encoding time can be reduced.

Figure 6:
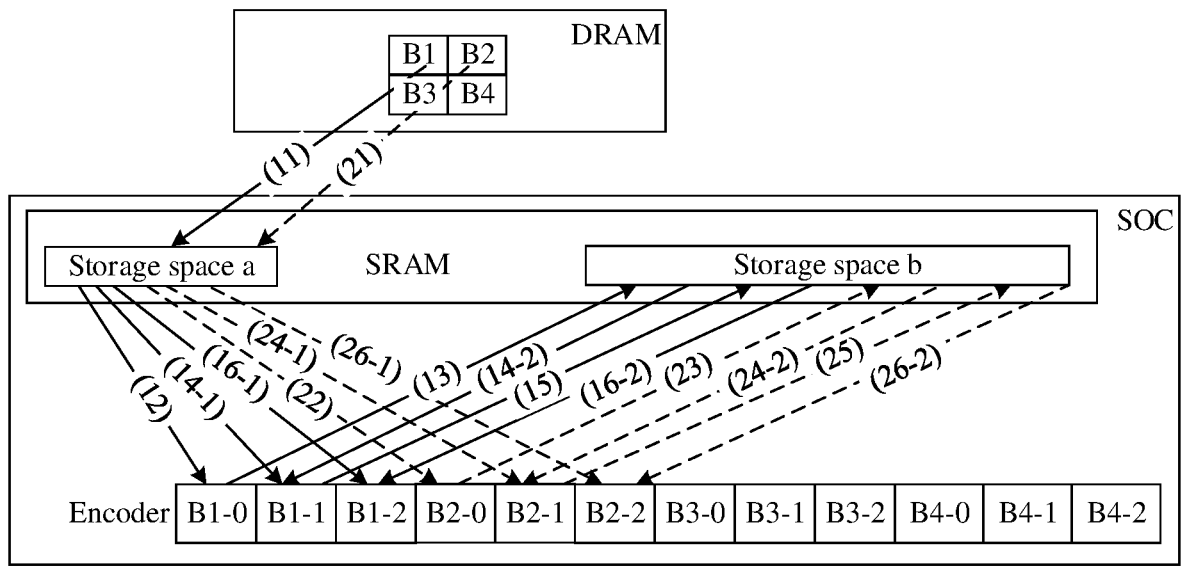
FIG. 6 is a schematic flowchart of multi-layer encoding of a frame of image according to an embodiment of this application.

Refer to FIG. 6. An example in which the image 1 includes four sub-images, that is, B1, B2, B3, and B4, scalable encoding is performed on three image layers of each sub-image, that is, a base layer, an enhancement layer 1, and an enhancement layer 2, and scalable encoding is performed on the four sub-images in the foregoing serial manner is used. FIG. 6 is a schematic flowchart of scalable encoding according to this application. As shown in FIG. 6, a scalable encoding procedure mainly includes the following steps.

Step 1. The encoder reads B1 from a DRAM and stores the B1 in the storage space a of an SRAM, as shown in (11) in FIG. 6.

Step 2. The encoder reads B1 from the storage space a, as shown in (12) in FIG. 6.

Step 3. The encoder encodes a base layer (that is, B1-0) of B1 based on B1, to obtain a bitstream of B1-0 and a reconstructed image of B1-0.

Step 4. The encoder writes the reconstructed image of B1-0 into the storage space b of the SRAM, as shown in (13) in FIG. 6.

Step 5. The encoder reads B1 from the storage space a, as shown in (14-1) in FIG. 6; and reads the reconstructed image of B1-0 from the storage space b, as shown in (14-2) in FIG. 6. Optionally, a performing order of (14-1) and (14-2) is not limited in this application.

Step 6. The encoder encodes an enhancement layer 1 (that is, B1-1) of B1 based on B1 and the reconstructed image of B1-0, to obtain a bitstream of B1-1 and a reconstructed image of B1-1.

Step 7. The encoder writes the reconstructed image of B1-1 into the storage space b, and overwrites the reconstructed image of B1-0, as shown in (15) in FIG. 6.

Step 8. The encoder reads B1 from the storage space a, as shown in (16-1) in FIG. 6; and reads the reconstructed image of B1-1 from the storage space b, as shown in (16-2) in FIG. 6. Optionally, a performing order of (16-1) and (16-2) is not limited in this application.

Step 9. The encoder encodes an enhancement layer 2 (that is, B1-2) of B1 based on B1 and the reconstructed image of B1-1, to obtain a bitstream of B1-2 and a reconstructed image of B1-2.

A process of three-layer encoding of B1 is described by using the foregoing step 1 to step 9. Further, a similar method may be used to sequentially complete the three-layer encoding of B2, B3, and B4, to implement the three-layer encoding of B1, B2, B3, and B4 in a serial manner. For example, three-layer encoding of B2 may be completed with reference to step 1 to step 9 and (21), (22), (23) (24-1), (24-2), (25), (26-1), and (26-2) in FIG. 6.

Figure 7:
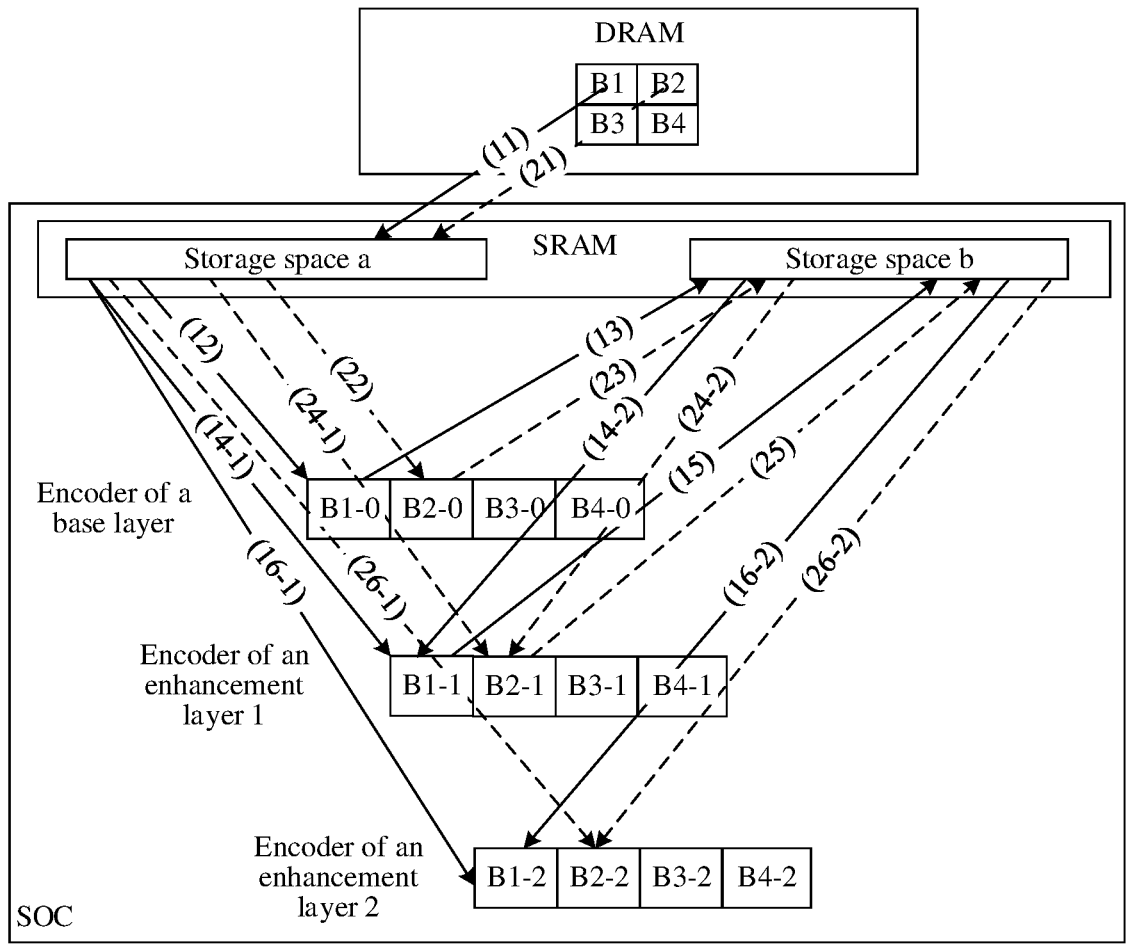
FIG. 7 is another schematic flowchart of multi-layer encoding of a frame of image according to an embodiment of this application.

Refer to FIG. 7. An example in which the image 1 includes four sub-images, that is, B1, B2, B3, and B4, scalable encoding is performed on three image layers of each sub-image, that is, a base layer, an enhancement layer 1, and an enhancement layer 2, and scalable encoding is performed on the four sub-images in the foregoing parallel manner is used. FIG. 7 is another schematic flowchart of scalable encoding according to this application. As shown in FIG. 7, a scalable encoding procedure mainly includes the following steps.

Step a. An encoder of the base layer reads B1 from a DRAM and stores B1 in a storage space a of an SRAM, as shown in (11) in FIG. 6.

Step b. The encoder of the base layer reads B1 from the storage space a, as shown in (12) in FIG. 6. The encoder of the base layer reads B2 from the DRAM and stores B2 in the storage space a, as shown in (21) in FIG. 6.

Step c. The encoder of the base layer encodes a base layer (that is, B1-0) of B1 based on B1, to obtain a bitstream of B1-0 and a reconstructed image of B1-0. The encoder of the base layer reads B2 from the storage space a, as shown in (22) in FIG. 6.

Step d. The encoder of the base layer writes the reconstructed image of B1-0 into the storage space b of the SRAM, as shown in (13) in FIG. 6. The encoder of the base layer encodes a base layer (that is, B2-0) of B2 based on B2, to obtain a bitstream of B2-0 and a reconstructed image of B2-0.

Step e. An encoder of the enhancement layer 1 reads B1 from the storage space a, as shown in (14-1) in FIG. 6; and reads the reconstructed image of the B1-0 from the storage space b, as shown in (14-2) in FIG. 6. The encoder of the base layer writes the reconstructed image of B2-0 into the storage space b of the SRAM, as shown in (23) in FIG. 6.

Optionally, a performing order of (14-1) and (14-2) is not limited in this application.

Step f. The encoder of the enhancement layer 1 encodes the enhancement layer 1 (that is, B1-1) of B1 based on B1 and the reconstructed image of B1-0, to obtain a bitstream of B1-1 and a reconstructed image of B1-1. The encoder of the enhancement layer 1 reads B2 from the storage space a, as shown in (24-1) in FIG. 6; and reads the reconstructed image of B2-0 from the storage space b, as shown in (24-2) in FIG. 6.

Optionally, a performing order of (24-1) and (24-2) is not limited in this application.

Step g. The encoder of the enhancement layer 1 writes the reconstructed image of B1-1 into the storage space b and overwrites the reconstructed image of B1-0, as shown in (15) in FIG. 6. The encoder of the enhancement layer 1 encodes the enhancement layer 1 of B2 (that is, B2-1) based on B2 and the reconstructed image of B2-0, to obtain a bitstream of B2-1 and a reconstructed image of B2-1.

Step h. An encoder of the enhancement layer 2 reads B1 from the storage space a, as shown in (16-1) in FIG. 6; and reads the reconstructed image of the B1-1 from the storage space b, as shown in (16-2) in FIG. 6. The encoder of the enhancement layer 1 writes the reconstructed image of B2-1 into the storage space b and overwrites the reconstructed image of B2-0, as shown in (25) in FIG. 6.

Optionally, a performing order of (16-1) and (16-2) is not limited in this application.

Step i. The encoder of the enhancement layer 2 encodes an enhancement layer 2 (that is, B1-2) of B1 based on B1 and the reconstructed image of B1-1, to obtain a bitstream of B1-2 and a reconstructed image of B1-2. The encoder of the enhancement layer 2 reads B2 from the storage space a, as shown in (26-1) in FIG. 6; and reads the reconstructed image of B2-1 from the storage space b, as shown in (26-2) in FIG. 6.

Optionally, a performing order of (26-1) and (26-2) is not limited in this application.

Step j. The encoder of the enhancement layer 2 encodes an enhancement layer 2 (that is, B2-2) of B2 based on B2 and the reconstructed image of B2-1, to obtain a bitstream of B2-2 and a reconstructed image of B2-2.

A process of performing three-layer encoding on B1 and B2 in a parallel manner is described by using the foregoing step a to step j. Similarly, a similar method may be used to perform three-layer encoding on B1, B2, B3, and B4 in a parallel manner. For example, B3 is read from the DRAM starting from step c, and B4 is read from the DRAM starting from step d.

In an existing solution, before encoding each image layer of a to-be-encoded image, the encoder needs to read the to-be-encoded image from the off-chip memory and store the to-be-encoded image in the on-chip memory, and then read the to-be-encoded image from the on-chip memory for encoding. In addition, for any two adjacent image layers (that is, adjacent image quality) of the to-be-encoded image, the encoder writes a reconstructed image of a lower image layer (that is, lower image quality) into the off-chip memory. Correspondingly, the encoder needs to read the reconstructed image of the lower image layer from the off-chip memory and store the reconstructed image in the on-chip memory, and then read the reconstructed image of the lower image layer from the on-chip memory to encode a higher (that is, higher image quality) image layer.

In other words, in the existing solution, the encoder needs to frequently access the off-chip memory to obtain image data required for encoding and/or store image data obtained by encoding. As a quantity of image layers increases, times of reading and writing the off-chip memory by the encoder and an amount of read and write data increase significantly. In addition, because the off-chip memory generally has features of a low read and write speed and high power consumption, costs and power consumption of accessing the off-chip memory and the on-chip memory by the encoder in the existing solution are relatively high.

It can be learned from FIG. 6 and FIG. 7 that in this application, the encoder needs to read the sub-image from the DRAM once only when obtaining the to-be-encoded sub-image for the first time, and store the sub-image into the SRAM, as shown in (11) in FIG. 6 and FIG. 7 or as shown in (21) in FIG. 6 and FIG. 7. In a subsequent process of encoding the plurality of image layers of the sub-image, the sub-image is read only from the SRAM for encoding, as shown in (12), (14-1), and (16-1) in FIG. 6 and FIG. 7 or as shown in (22), (24-1), and (26-1) in FIG. 6 and FIG. 7. In addition, for any two adjacent image layers, the encoder writes a reconstructed image of a lower (that is, lower image quality) image layer into the SRAM, as shown in (13) and (15) in FIG. 6 and FIG. 7 or as shown in (23) and (25) in FIG. 6 and FIG. 7. Correspondingly, the encoder may read only the reconstructed image of the lower image layer from the SRAM to encode a higher (that is, higher image quality) image layer, as shown in (14-2) and (16-2) in FIG. 6 and FIG. 7 or as shown in (24-2) and (26-2) in FIG. 6 and FIG. 7.

It can be seen that, by using the image encoding method provided in this application, times of reading and writing the off-chip memory and the on-chip memory and an amount of read and write data can be reduced. In addition, because the on-chip memory generally has features of a high read and write speed and low power consumption, the image encoding method provided in this application can reduce costs and power consumption of accessing the off-chip memory and the on-chip memory by the encoder.

Optionally, the first memory may include a plurality of storage spaces. Different storage spaces are configured to store bitstreams of different image layers. The method 400 further includes: The encoder writes the bitstreams of the different image layers into the storage space in the first memory corresponding to each image layer.

In a possible implementation, for example, the plurality of image layers of the first sub-image include a base layer and a first enhancement layer. The first memory may include a first storage space and a second storage space. The first storage space is configured to store bitstreams of base layers, and the second storage space is configured to store bitstreams of first enhancement layers. After the bitstream of the base layer of the first sub-image is obtained, the encoder may write the bitstream of the base layer of the first sub-image into the first storage space. After the bitstream of the first enhancement layer of the first sub-image is obtained, the bitstream of the first enhancement layer of the first sub-image is written into the second storage space.

Similarly, after the bitstream of each image layer of another sub-image in the first frame of image is obtained, the encoder may write the bitstream of each image layer of the other sub-images into a corresponding storage space.

Optionally, storage positions of the bitstreams of the different sub-images in the same storage space of the first memory is not limited in this application. In a possible implementation, the encoder may write bitstreams of adjacent sub-images into adjacent address segments.

Further, each time a quantity of sub-images corresponding to bitstreams of base layers stored in the first storage space reaches a preset first quantity, the encoder reads the bitstreams of the base layers of the first quantity of sub-images and sends the bitstreams to a decoder side. Similarly, each time a quantity of sub-images corresponding to bitstreams of first enhancement layers stored in the second storage space reaches the first quantity, the encoder reads the bitstreams of the first enhancement layers of the first quantity of sub-images and sends the bitstreams to the decoder side.

In a Wi-Fi network, before sending data to the decoder side each time, the encoder side needs to preempt a channel used for transmitting data. However, channel preemption may fail, or a success rate of channel preemption is relatively limited. Therefore, in this application, bitstreams of same image layers of sub-images are sequentially stored in the off-chip memory, and are sent to the decoder side after a specific data amount is accumulated. In this way, a quantity of channel preemption times can be reduced, thereby improving data transmission efficiency.

For example, the first sub-image is an image block, and the first quantity may be one Slice or one frame.

Figure 8:
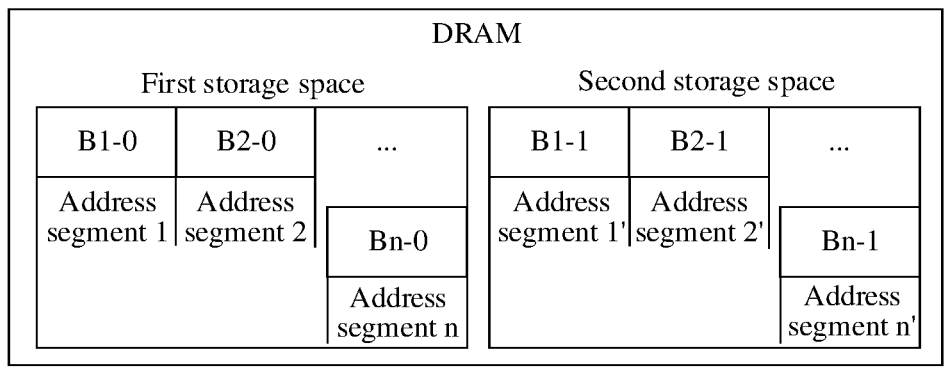
FIG. 8 is a schematic diagram of storage space of a dynamic random access memory according to an embodiment of this application.

Refer to FIG. 8. An example in which a frame of image is divided into m sub-images (for example, B1, B2, . . . , Bm, where m is an integer greater than 2), the encoder performs two-layer (for example, a base layer and a first enhancement layer) encoding on each sub-image in the m sub-images, the DRAM includes a first storage space and a second storage space, the first storage space is configured to store bitstreams of base layers, and the second storage space is configured to store bitstreams of first enhancement layers is used as an example. FIG. 8 is a schematic diagram of storage space of a DRAM according to an embodiment of this application.

As shown in FIG. 8, the encoder sequentially writes a bitstream of a base layer (that is, B1-0) of B1, a bitstream of a base layer (that is, B2-0) of B2, . . . , and a bitstream of a base layer (that is, Bm-0) of Bm into an adjacent address segment in the first storage space (for example, writes a bitstream into the DRAM each time the bitstream is obtained). For example, B1-0 is written into an address segment 1, B2-0 is written into an address segment 2, and an end address of the address segment 1 is adjacent to a start address of the address segment 2.

Similarly, the encoder sequentially writes a bitstream of a first enhancement layer (that is, B1-1) of B1, a bitstream of a first enhancement layer (that is, B2-1) of B2, . . . , and a bitstream of a first enhancement layer (that is, Bm-1) of Bm into an adjacent address segment in the second storage space (for example, writes a bitstream into the DRAM each time the bitstream is obtained). For example, B1-1 is written into an address segment 1', B2-1 is written into an address segment 2', and an end address of the address segment 1' is adjacent to a start address of the address segment 2'.

Optionally, if a preset sending condition is met when bitstreams of n sub-images are stored in the first storage space and the second storage space (n is an integer less than m), the encoder reads currently stored bitstreams of base layers of the n sub-images and currently stored bitstreams of first enhancement layers of the n sub-images from the DRAM, and sends the bitstreams to the decoder side. Then, bitstreams of base layers of Bn+1, Bn+2 . . . , Bm are continuously written into the first storage space in sequence, and bitstreams of first enhancement layers of Bn+1, Bn+2 . . . , Bm are written into the second storage space in sequence until the sending condition is met again. The encoder reads the bitstreams of the base layers of all the sub-images stored this time and the bitstreams of the first enhancement layers of all the sub-images stored this time from the DRAM again, and sends the bitstreams to the decoder side. By analogy, all bitstreams of the m sub-images are sent to the decoder side.

In a possible implementation, the sending condition may be that a quantity of sub-images corresponding to the bitstreams stored in the first storage space and the second storage space reaches the preset first quantity, that is, n; or the sending condition may be that a data amount of the bitstreams stored in the first storage space and the second storage space reaches a preset first data amount.

Optionally, if the bitstreams stored in the first storage space and the second storage space do not meet the sending condition, but all bitstreams obtained by encoding a frame of image are written into the DRAM, the encoder reads, from the DRAM, the bitstreams of the base layers of all the sub-images stored this time and the bitstreams of the first enhancement layers of all the sub-images stored this time, and sends the bitstreams to the decoder side. So far, the image encoding apparatus completes scalable encoding and transmission of the entire frame of image.

Optionally, the method 400 may further include: The encoder may alternatively write a reconstructed image of each image layer of the first sub-image into the off-chip memory, to generate an inter-frame reference image of the second frame of image; or write a reconstructed image of each image layer of the first sub-image into the off-chip memory after performing loop filtering processing, to improve image quality. The second frame of image is located after the first frame of image in the time-frequency frame sequence.

Figure 9:
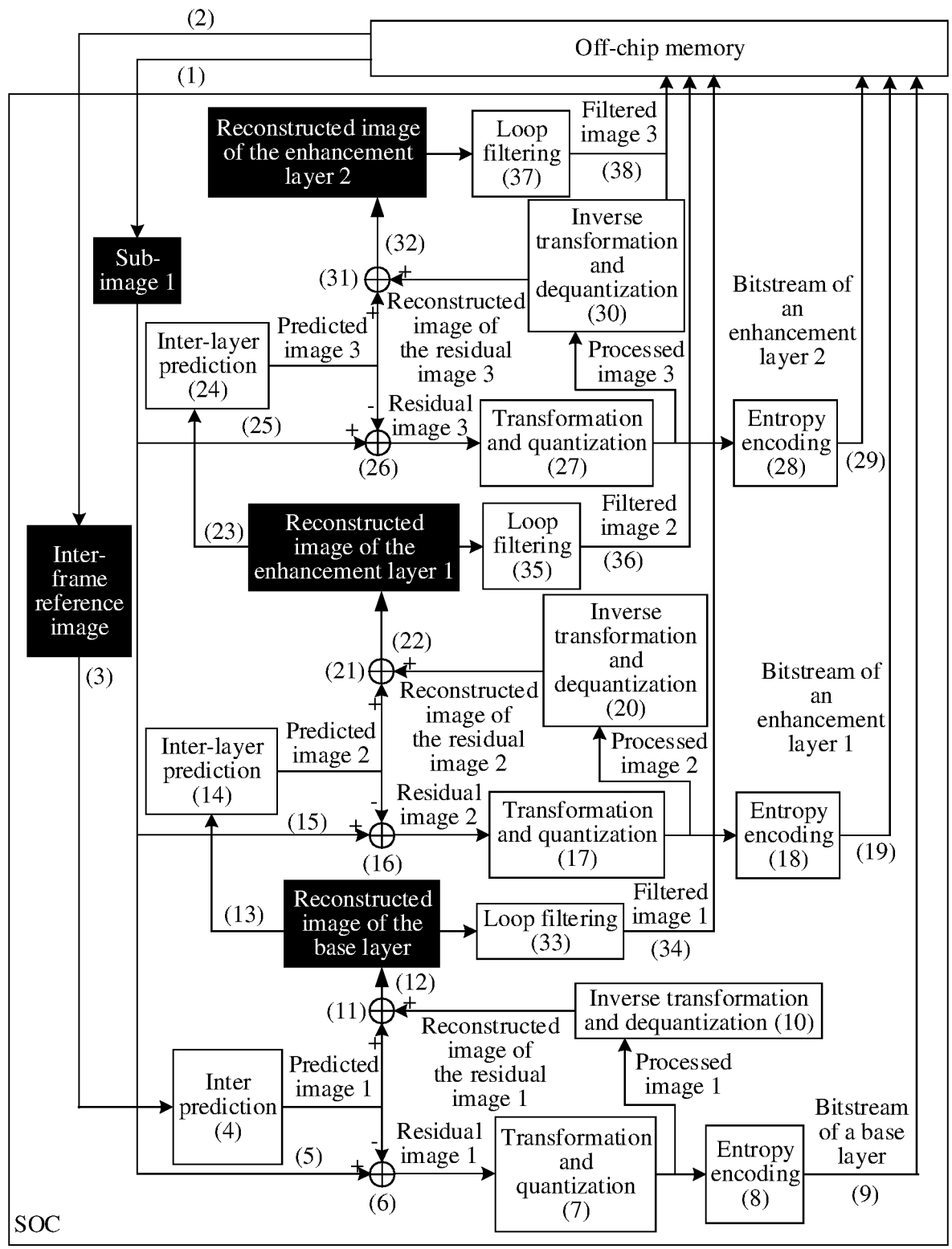
FIG. 9 is a schematic diagram of an example of an encoding procedure on an encoder side according to an embodiment of this application.

Refer to FIG. 9. An example in which three-layer encoding is performed on a sub-image in an entire frame of image is used. FIG. 9 is a schematic diagram of an example of an encoding procedure on an encoder side according to an embodiment of this application. It should be noted that, as shown in FIG. 9, the encoding procedure on the encoder side includes the following steps. It should be noted that the following steps may be performed in various orders and/or simultaneously, and are not limited to an execution order shown in FIG. 9.

(1) The encoder reads the sub-image 1 in the first frame of image from the off-chip memory of the SOC, and stores the sub-image 1 in the on-chip memory of the SOC.

It should be noted that, for clarity, each block with a black background in FIG. 9 represents writing into the on-chip memory.

(2) The encoder reads an inter-frame reference image of the sub-image 1 from the off-chip memory.

(3) The encoder reads the inter-frame reference image from the on-chip memory.

(4) The encoder performs inter prediction on the inter-frame reference image, to obtain a predicted image 1.

(5) The encoder reads the sub-image 1 from the on-chip memory.

(6) The encoder performs residual calculation on the sub-image 1 and the predicted image 1, to obtain a residual image 1.

(7) The encoder performs transformation and quantization processing on the residual image 1, to obtain a processed image 1.

(8) The encoder performs entropy encoding on the processed image 1, to obtain a bitstream of a base layer of the sub-image 1.

(9) The encoder writes the bitstream of the base layer of the sub-image 1 into the off-chip memory.

(10) The encoder performs inverse transformation and dequantization processing on the processed image 1, to obtain a reconstructed image of the residual image 1.

(11) The encoder performs combination calculation on the reconstructed image of the predicted image 1 and the residual image 1, to obtain a reconstructed image of the base layer of the sub-image 1.

(12) The encoder directly writes the reconstructed image of the base layer of the sub-image 1 into the on-chip memory.

(13) The encoder reads the reconstructed image of the base layer of the sub-image 1 from the on-chip memory.

(14) The encoder performs inter-layer prediction on the reconstructed image of the base layer of the sub-image 1, to obtain a predicted image 2.

(15) The encoder reads the sub-image 1 from the on-chip memory.

(16) The encoder performs residual calculation on the sub-image 1 and the predicted image 2, to obtain a residual image 2.

(17) The encoder performs transformation and quantization processing on the residual image 2, to obtain a processed image 2.

(18) The encoder performs entropy encoding on the processed image 2, to obtain a bitstream of an enhancement layer 1 of the sub-image 1.

(19) The encoder writes the bitstream of the enhancement layer 1 of the sub-image 1 into the off-chip memory.

(20) The encoder performs inverse transformation and dequantization processing on the processed image 2, to obtain a reconstructed image of the residual image 2.

(21) The encoder performs combination calculation on the reconstructed image of the predicted image 2 and the residual image 2, to obtain a reconstructed image of the enhancement layer 1 of the sub-image 1.

(22) The encoder directly writes the reconstructed image of the enhancement layer 1 of the sub-image 1 into the on-chip memory.

(23) The encoder reads the reconstructed image of the enhancement layer 1 of the sub-image 1 from the on-chip memory.

(24) The encoder performs inter-layer prediction on the reconstructed image of the enhancement layer 1 of the sub-image 1, to obtain a predicted image 3.

(25) The encoder reads the sub-image 1 from the on-chip memory.

(26) The encoder performs residual calculation on the sub-image 1 and the predicted image 3, to obtain a residual image 3.

(27) The encoder performs transformation and quantization processing on the residual image 3, to obtain a processed image 3.

(28) The encoder performs entropy encoding on the processed image 3, to obtain a bitstream of an enhancement layer 2 of the sub-image 1.

(29) The encoder writes the bitstream of the enhancement layer 2 of the sub-image 1 into the off-chip memory.

(30) The encoder performs inverse transformation and dequantization processing on the processed image 3, to obtain a reconstructed image of the residual image 3.

(31) The encoder performs combination calculation on the reconstructed image of the predicted image 3 and the residual image 3, to obtain a reconstructed image of the enhancement layer 2 of the sub-image 1.

(32) The encoder directly writes the reconstructed image of the enhancement layer 2 of the sub-image 1 into the on-chip memory.

Optionally, this procedure may further include the following steps.

(33) The encoder performs loop filtering processing on the reconstructed image of the base layer of the sub-image 1, to obtain a filtered image 1.

(34) The encoder writes the filtered image 1 into the off-chip memory.

(35) The encoder performs loop filtering processing on the reconstructed image of the enhancement layer 1 of the sub-image 1, to obtain a filtered image 2.

(36) The encoder writes the filtered image 2 into the off-chip memory.

(37) The encoder performs loop filtering processing on the reconstructed image of the enhancement layer 1 of the sub-image 1, to obtain a filtered image 3.

(38) The encoder writes the filtered image 3 into the off-chip memory.

Optionally, the filtered image 1, the filtered image 2, and the filtered image 3 may be used for encoding an inter-frame reference image of a next frame of image.

It should be noted that, for content and corresponding beneficial effects that are not described in detail in FIG. 9, refer to related descriptions in the method 400. Details are not described herein again.

Figure 10:
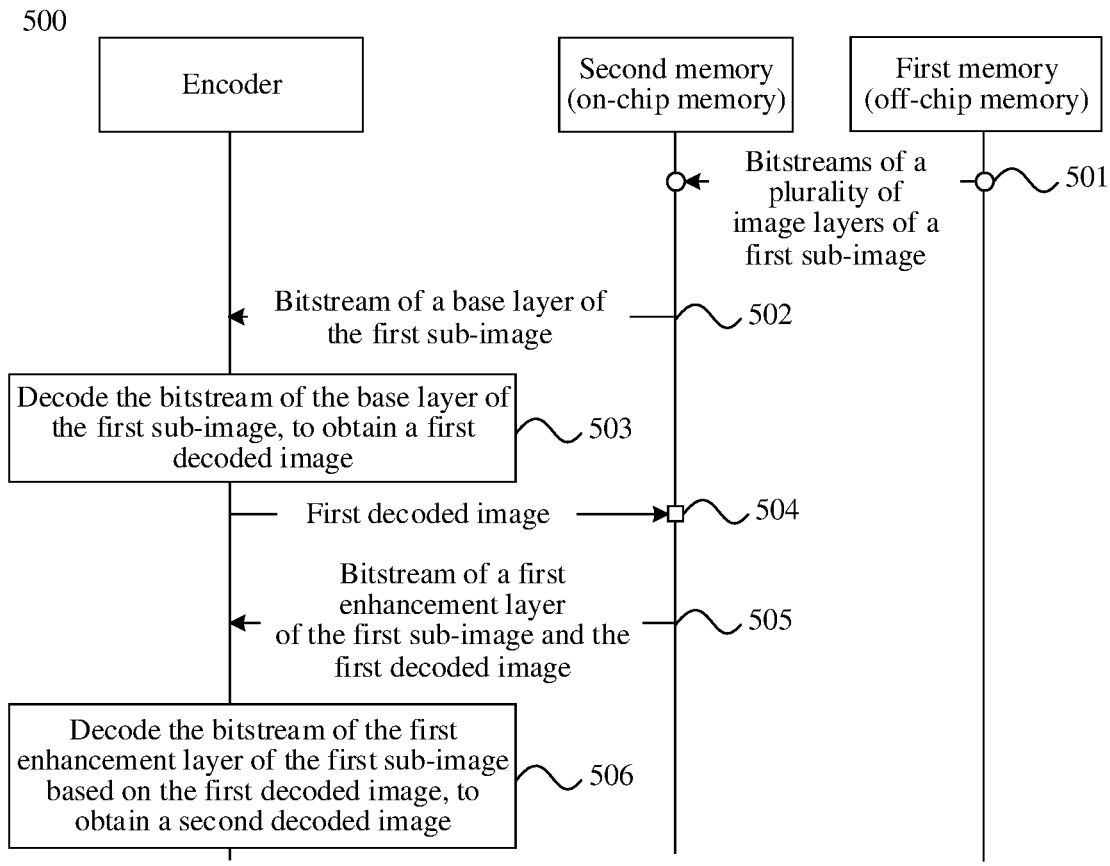
FIG. 10 is a schematic flowchart of an image decoding method 500 according to an embodiment of this application.

Refer to FIG. 10. FIG. 10 is a schematic flowchart of an image decoding method 500 according to an embodiment of this application. The method 500 may be applied to the image decoding apparatus 300. The method 500 is described as a series of steps or operations. However, it should be understood that the method 500 may be performed in various orders and/or simultaneously, and is not limited to a performing order shown in FIG. 10. As shown in FIG. 10, the method 500 may include the following steps.

Step 501: A decoder reads bitstreams of a plurality of image layers of a first sub-image of a first frame of image from a first memory, and writes the bitstreams of the plurality of image layers of the first sub-image into a second memory. The first memory is an off-chip memory, the second memory is an on-chip memory, the first frame of image includes a plurality of sub-images, the plurality of sub-images include the first sub-image, the plurality of image layers include a base layer and a first enhancement layer, and image quality of the first enhancement layer is higher than image quality of the base layer.

In other words, the decoder writes the bitstreams of the plurality of image layers of the first sub-image into the second memory.

It should be noted that the decoder and the second memory in step 501 may be located inside the SOC, and the first memory in step 501 may be disposed outside the SOC.

For example, the SOC may be the SOC 310 shown in FIG. 3, the decoder may be the decoder 311 shown in FIG. 3, the second memory may be the on-chip memory 312 shown in FIG. 3, and the first memory may be the off-chip memory 320 shown in FIG. 3.

For example, the first memory may be a DRAM, and the second memory may be an SRAM.

Optionally, the first frame of image may be any frame in a video frame sequence. This is not limited in embodiments of this application.

Optionally, the first sub-image may be any one of the plurality of sub-images. This is not limited in embodiments of this application.

Optionally, the sub-image may be, but is not limited to, a block, an MB, an LCU, or another block-level image in a frame of image. This is not limited in embodiments of this application. The block-level image herein refers to an image that does not completely comply with a standard size specified for a block, a macro block, or a largest coding unit, but whose size difference with the standard size of the block, the macro block, or the largest coding unit is less than a preset size threshold.

Step 502: The decoder reads a bitstream of a base layer of the first sub-image from the second memory.

Step 503: The decoder decodes the bitstream of the base layer of the first sub-image, to obtain a first decoded image, and the first decoded image is a decoded image of the base layer of the first sub-image.

Step 504: The decoder writes the first decoded image into the second memory.

In a possible implementation, the decoder may directly write the first decoded image into the on-chip memory. In other words, the first decoded image is an image that is not processed by using loop filtering.

Step 505: The decoder reads a bitstream of a first enhancement layer of the first sub-image and the first decoded image from the second memory.

Step 506: The decoder decodes the bitstream of the first enhancement layer of the first sub-image based on the first decoded image, to obtain a second decoded image, and the second decoded image is a decoded image of the first enhancement layer of the first sub-image.

Optionally, after the second decoded image is obtained, the method 500 further includes: The decoder writes the second decoded image into the second memory, and overwrites the first decoded image with the second decoded image.

Optionally, the plurality of image layers further include a second enhancement layer, and image quality of the second enhancement layer is higher than image quality of the first enhancement layer. The method 500 further includes: The decoder reads a bitstream of a second enhancement layer of the first sub-image and the second decoded image from the second memory. The decoder decodes the bitstream of the second enhancement layer of the first sub-image based on the second decoded image, to obtain a third decoded image, and the third decoded image is a decoded image of the second enhancement layer of the first sub-image. The decoder writes the third decoded image into the second memory, and overwrites the second decoded image with the third decoded image.

Optionally, the method further includes: The decoder writes a decoded image of a target image layer of the first sub-image into the first memory, and the target image layer is an image layer with highest image quality among the plurality of image layers.

Further, each time a quantity of sub-images corresponding to decoded image stored in the first memory reaches a preset first quantity, the decoder reads the decoded images of the first enhancement layers of the first quantity of sub-images, and sends the decoded images to a display device.

Optionally, the plurality of sub-images further include a second sub-image, and a decoding order of the second sub-image is adjacent to a decoding order of the first sub-image. The method 500 further includes: After decoding of the bitstreams of the plurality of image layers of the first sub-image is completed, the decoder decodes bitstreams of a plurality of image layers of the second sub-image; or the decoder decodes a bitstream of a base layer of the second sub-image while decoding the bitstream of the first enhancement layer of the first sub-image.

Optionally, the decoder may alternatively write the decoded image of each image layer of the first sub-image into the off-chip memory, to generate an inter-frame reference image; or write the decoded image of each image layer of the first sub-image into the off-chip memory after performing loop filtering processing, to improve image quality. The second frame of image is located after the first frame of image in the time-frequency frame sequence.

It should be noted that, because a decoding process is an inverse process of an encoding process, for content and beneficial effects that are not described in detail in FIG. 10, refer to FIG. 4. Details are not described herein again.

So far, the image decoding apparatus completes scalable decoding and display of the bitstreams of the entire frame of image.

With reference to FIG. 4 to FIG. 10, the foregoing describes the encoding and decoding method provided in embodiments of this application. The following describes an encoder and a decoder provided in embodiments of this application.

Figure 11:
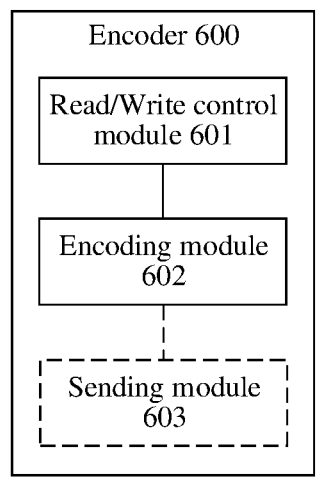
FIG. 11 is a schematic block diagram of an encoder 600 according to an embodiment of this application.

Refer to FIG. 11. FIG. 11 is a schematic diagram of a structure of an encoder 600 according to an embodiment of this application. The encoder 600 may be used in an encoding apparatus on an encoder side. As shown in FIG. 11, the encoder 600 may include a read/write control module 601 and an encoding module 602.

The read/write control module 601 is configured to read a first sub-image of a first frame of image from a first memory, and store the first sub-image in a second memory, where the first memory is an off-chip memory, the second memory is an on-chip memory, the first frame of image includes a plurality of sub-images, and the plurality of sub-images include the first sub-image; and read the first sub-image from the second memory.

The encoding module 602 is configured to encode a base layer of the first sub-image based on the first sub-image, to obtain a bitstream of the base layer of the first sub-image and a first reconstructed image. The first reconstructed image is a reconstructed image of the base layer of the first sub-image.

The read/write control module 601 is further configured to write the first reconstructed image into the second memory, and read the first reconstructed image and the first sub-image from the second memory.

The encoding module 602 is further configured to encode a first enhancement layer of the first sub-image based on the first reconstructed image and the first sub-image, to obtain a bitstream of the first enhancement layer of the first sub-image and a second reconstructed image. The second reconstructed image is a reconstructed image of the first enhancement layer of the first sub-image, and image quality of the first enhancement layer is higher than image quality of the base layer.

In a possible implementation, the encoding module 602 is specifically configured to directly write the second reconstructed image into the second memory.

In a possible implementation, the read/write control module 601 is further configured to, after the second reconstructed image is obtained, write the second reconstructed image into the second memory, and overwrite the first reconstructed image with the second reconstructed image.

In a possible implementation, the read/write control module 601 is further configured to read the second reconstructed image and the first sub-image from the second memory. The encoding module 602 is further configured to encode a second enhancement layer of the first sub-image based on the second reconstructed image and the first sub-image, to obtain a bitstream of the second enhancement layer of the first sub-image and a third reconstructed image. The third reconstructed image is a reconstructed image of the second enhancement layer of the first sub-image, and image quality of the second enhancement layer is higher than image quality of the first enhancement layer. The read/write control module 601 is further configured to write the third reconstructed image into the second memory, and overwrite the second reconstructed image with the third reconstructed image.

In a possible implementation, the first memory includes a first storage space and a second storage space. The first storage space is configured to store bitstreams of base layers, and the second storage space is configured to store bitstreams of first enhancement layers. The read/write control module 601 is further configured to write the bitstream of the base layer of the first sub-image into the first storage space, and write the bitstream of the first enhancement layer of the first sub-image into the second storage space.

In a possible implementation, the encoder 600 may further include a sending module 603. The read/write control module 601 is further configured to, each time a quantity of sub-images corresponding to bitstreams of base layers stored in the first storage space reaches a preset first quantity, read the bitstreams of the base layers of the first quantity of sub-images. The sending module 603 is configured to send the bitstreams of the base layers of the first quantity of sub-images to the decoder side. The read/write control module 601 is further configured to, each time a quantity of sub-images corresponding to bitstreams of first enhancement layers stored in the second storage space reaches the first quantity, read the bitstreams of the first enhancement layers of the first quantity of sub-images. The sending module 603 is further configured to send the bitstreams of the first enhancement layers of the first quantity of sub-images to the decoder side.

In a possible implementation, the plurality of sub-images further include a second sub-image, and an encoding order of the second sub-image is adjacent to an encoding order of the first sub-image. The encoding module 602 is further configured to, after encoding the plurality of image layers of the first sub-image is completed, encode a plurality of image layers of the second sub-image, where the plurality of image layers include a base layer and a first enhancement layer; or encode a base layer of the second sub-image while encoding the first enhancement layer of the first sub-image.

In a possible implementation, the sub-image is a block, a macro block, or a largest coding unit.

In a possible implementation, the second memory is a static random access memory SRAM, and the first memory is a dynamic random access memory DRAM.

The encoder 600 may be configured to perform the technical solution of the method embodiment shown in FIG.

4, an implementation principle and a technical effect thereof are similar, and details are not described herein again.

Figure 12:
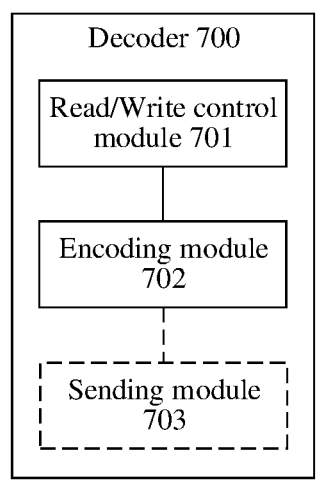
FIG. 12 is a schematic block diagram of a decoder 700 according to an embodiment of this application.

Refer to FIG. 12. FIG. 12 is a schematic diagram of a structure of a decoder 700 according to an embodiment of this application. The decoder 700 may be used in a decoding apparatus on a decoder side. As shown in FIG. 12, the decoder 700 may include a read/write control module 701 and a decoding module 702.

The read/write control module 701 is configured to read bitstreams of a plurality of image layers of a first sub-image of a first frame of image from a first memory, and write the bitstreams of the plurality of image layers of the first sub-image into a second memory. The first memory is an off-chip memory, the second memory is an on-chip memory, the first frame of image includes a plurality of sub-images, the plurality of sub-images include the first sub-image, the plurality of image layers include a base layer and a first enhancement layer, and image quality of the first enhancement layer is higher than image quality of the base layer.

The decoding module 702 is configured to decode the bitstream of the base layer of the first sub-image, to obtain a first decoded image, and the first decoded image is a decoded image of the base layer of the first sub-image.

The read/write control module 701 is further configured to write the first decoded image into the second memory; and read the bitstream of a first enhancement layer of the first sub-image and the first decoded image from the second memory.

The decoding module 702 is further configured to decode the bitstream of the first enhancement layer of the first sub-image based on the first decoded image, to obtain a second decoded image, and the second decoded image is a decoded image of the first enhancement layer of the first sub-image.

In a possible implementation, the read/write control module 701 is specifically configured to directly write the first decoded image into the second memory.

In a possible implementation, the read/write control module 701 is further configured to, after the second decoded image is obtained, write the second decoded image into the second memory, and overwrite the first decoded image with the second decoded image.

In a possible implementation, the plurality of image layers further include a second enhancement layer. Image quality of the second enhancement layer is higher than image quality of the first enhancement layer. The read/write control module 701 is further configured to read a bitstream of a second enhancement layer of the first sub-image and the second decoded image from the second memory. The decoding module 702 is further configured to decode the bitstream of the second enhancement layer of the first sub-image based on the second decoded image to obtain a third decoded image. The third decoded image is a decoded image of the second enhancement layer of the first sub-image. The read/write control module 701 is further configured to write the third decoded image into the second memory, and overwrite the second decoded image with the third decoded image.

In a possible implementation, the read/write control module 701 is further configured to write a decoded image of a target image layer of the first sub-image into the first memory. The target image layer is an image layer with highest image quality among the plurality of image layers.

In a possible implementation, the decoder 700 may further include a sending module 703. The read/write control module 701 is further configured to, each time a quantity of sub-images corresponding to decoded image stored in the first memory reaches a preset first quantity, read the decoded images of the first enhancement layers of the first quantity of sub-images. The sending module 703 is configured to send the decoded images of the first enhancement layers of the first quantity of sub-images to a display device.

In a possible implementation, the plurality of sub-images further include a second sub-image, and a decoding order of the second sub-image is adjacent to a decoding order of the first sub-image, and the decoding module 702 is further configured to, after decoding of bitstreams of the plurality of image layers of the first sub-image is completed, decode bitstreams of a plurality of image layers of the second sub-image; or the decoding module 702 is further configured to decode a bitstream of a base layer of the second sub-image while decoding the bitstream of the first enhancement layer of the first sub-image.

In a possible implementation, the sub-image is a block, a macro block, or a largest coding unit.

In a possible implementation, the second memory is a static random access memory SRAM, and the first memory is a dynamic random access memory DRAM.

The decoder 700 may be configured to perform the technical solution of the method embodiment shown in FIG. 10, an implementation principle and a technical effect thereof are similar, and details are not described herein again.

An embodiment of this application further provides a computer storage medium. The computer storage medium stores computer instructions. When the computer instructions are run on an electronic device, the electronic device is enabled to perform the foregoing related method steps to implement the image encoding method and/or the image decoding method in the foregoing embodiment.

An embodiment of this application further provides a computer program product. When the computer program product is run on a computer, the computer is enabled to perform the foregoing related steps, to implement the image encoding method and/or the image decoding method in the foregoing embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   reading a first sub-image of a first frame of image from a first memory, and storing the first sub-image into a second memory, wherein the first memory is an off-chip memory, the second memory is an on-chip memory, the first frame of image comprises a plurality of sub-images, and the plurality of sub-images comprise the first sub-image;
   encoding a base layer of the first sub-image based on the first sub-image, to obtain a bitstream of the base layer of the first sub-image and a first reconstructed image, wherein the first reconstructed image is of the base layer of the first sub-image;
   writing the first reconstructed image into the second memory;
   reading the first reconstructed image and the first sub-image from the second memory; and
   encoding a first enhancement layer of the first sub-image based on the first reconstructed image and the first sub-image, to obtain a bitstream of the first enhancement layer of the first sub-image and a second reconstructed image, wherein the second reconstructed image is of the first enhancement layer of the first sub-image, and an image quality of the first enhancement layer is higher than an image quality of the base layer.

2. The method according to claim 1, wherein after the second reconstructed image is obtained, the method further comprises:
   writing the second reconstructed image into the second memory, and overwriting the first reconstructed image with the second reconstructed image.

3. The method according to claim 2, further comprising:
   reading the second reconstructed image and the first sub-image from the second memory;
   encoding a second enhancement layer of the first sub-image based on the second reconstructed image and the first sub-image, to obtain a bitstream of the second enhancement layer of the first sub-image and a third reconstructed image, wherein the third reconstructed image is of the second enhancement layer of the first sub-image, and an image quality of the second enhancement layer is higher than an image quality of the first enhancement layer; and
   writing the third reconstructed image into the second memory, and overwriting the second reconstructed image with the third reconstructed image.

4. The method according to claim 1, wherein the first memory comprises a first storage space and a second storage space, the first storage space is used to store bitstreams of base layers, the second storage space is used to store bitstreams of first enhancement layers, and the method further comprises:
   writing the bitstream of the base layer of the first sub-image into the first storage space; and
   writing the bitstream of the first enhancement layer of the first sub-image into the second storage space.

5. The method according to claim 4, further comprising:
   each time a quantity of sub-images corresponding to bitstreams of base layers stored in the first storage space reaches a preset first quantity, reading the bitstreams of the base layers of the first quantity of sub-images and sending the bitstreams to a decoder side; and
   each time a quantity of sub-images corresponding to bitstreams of first enhancement layers stored in the second storage space reaches the first quantity, reading the bitstreams of the first enhancement layers of the first quantity of sub-images and sending the bitstreams to the decoder side.

6. The method according to claim 1, wherein the plurality of sub-images further comprises a second sub-image, an encoding order of the second sub-image is adjacent to an encoding order of the first sub-image, and the method further comprises:
   encoding a plurality of image layers of the second sub-image after encoding of a plurality of image layers of the first sub-image is completed, wherein the plurality of image layers comprise the base layer and the first enhancement layer; or
   encoding a base layer of the second sub-image while encoding the first enhancement layer of the first sub-image.

7. The method according to claim 1, wherein the sub-image is a block, a macro block, or a largest coding unit.

8. The method according to claim 1, wherein the second memory is a static random access memory (SRAM), and the first memory is a dynamic random access memory (DRAM).

9. An apparatus, comprising:
   a system on chip (SOC) comprising an encoder, a second memory, and a communication interface, wherein the encoder, the second memory, and the communication interface are coupled to each other; and a first memory, wherein the first memory is located on an outer side of the SOC, and the first memory is coupled to the communication interface; and wherein the encoder is configured to:
read a first sub-image of a first frame of image from the first memory, and store the first sub-image into the second memory, wherein the first frame of image comprises a plurality of sub-images, and the plurality of sub-images comprise the first sub-image;
encode a base layer of the first sub-image based on the first sub-image, to obtain a bitstream of the base layer of the first sub-image and a first reconstructed image, wherein the first reconstructed image is of the base layer of the first sub-image;
write the first reconstructed image into the second memory;
read the first reconstructed image and the first sub-image from the second memory; and
encode a first enhancement layer of the first sub-image based on the first reconstructed image and the first sub-image, to obtain a bitstream of the first enhancement layer of the first sub-image and a second reconstructed image, wherein the second reconstructed image is of the first enhancement layer of the first sub-image, and an image quality of the first enhancement layer is higher than an image quality of the base layer.

10. The apparatus according to claim 9, wherein the encoder is further configured to:
after the second reconstructed image is obtained, write the second reconstructed image into the second memory, and overwrite the first reconstructed image with the second reconstructed image.

11. The apparatus according to claim 10, wherein the encoder is further configured to:
read the second reconstructed image and the first sub-image from the second memory;
encode a second enhancement layer of the first sub-image based on the second reconstructed image and the first sub-image, to obtain a bitstream of the second enhancement layer of the first sub-image and a third reconstructed image, wherein the third reconstructed image is of the second enhancement layer of the first sub-image, and an image quality of the second enhancement layer is higher than an image quality of the first enhancement layer; and
write the third reconstructed image into the second memory, and overwrite the second reconstructed image with the third reconstructed image.

12. The apparatus according to claim 9, wherein the first memory comprises a first storage space and a second storage space, the first storage space is configured to store bitstreams of base layers, the second storage space is configured to store bitstreams of first enhancement layers, and the encoder is further configured to:
write the bitstream of the base layer of the first sub-image into the first storage space; and
write the bitstream of the first enhancement layer of the first sub-image into the second storage space.

13. The apparatus according to claim 12, wherein the encoder is further configured to:
each time a quantity of sub-images corresponding to bitstreams of base layers stored in the first storage space reaches a preset first quantity, read the bitstreams of the base layers of the first quantity of sub-images and send the bitstreams to a decoder side; and
each time a quantity of sub-images corresponding to bitstreams of first enhancement layers stored in the second storage space reaches the first quantity, read the bitstreams of the first enhancement layers of the first quantity of sub-images and send the bitstreams to the decoder side.

14. The apparatus according to claim 9, wherein the plurality of sub-images further comprise a second sub-image, an encoding order of the second sub-image is adjacent to an encoding order of the first sub-image, and the encoder is further configured to:
encode a plurality of image layers of the second sub-image after encoding of a plurality of image layers of the first sub-image is completed, wherein the plurality of image layers comprise the base layer and the first enhancement layer; or
encode a base layer of the second sub-image while encoding the first enhancement layer of the first sub-image.

15. The apparatus according to claim 9, wherein the sub-image is a block, a macro block, or a largest coding unit.

16. The apparatus according to claim 9, wherein the second memory is a static random access memory (SRAM), and the first memory is a dynamic random access memory (DRAM).

17. An apparatus, comprising:
a system on chip (SOC) comprising a decoder, a second memory, and a communication interface, wherein the decoder, the second memory, and the communication interface are coupled to each other; and
a first memory, wherein the first memory is located on an outer side of the SOC, and the first memory is coupled to the communication interface; and
wherein the decoder is configured to:
read bitstreams of a plurality of image layers of a first sub-image of a first frame of image from the first memory, and write the bitstreams of the plurality of image layers of the first sub-image into the second memory, wherein, the first frame of image comprises a plurality of sub-images, the plurality of sub-images comprise the first sub-image, the plurality of image layers comprise a base layer and a first enhancement layer, and an image quality of the first enhancement layer is higher than an image quality of the base layer;
decode a bitstream of a base layer of the first sub-image, to obtain a first decoded image, wherein the first decoded image is of the base layer of the first sub-image;
write the first decoded image into the second memory;
read a bitstream of a first enhancement layer of the first sub-image and the first decoded image from the second memory; and
decode the bitstream of the first enhancement layer of the first sub-image based on the first decoded image, to obtain a second decoded image, wherein the second decoded image is of the first enhancement layer of the first sub-image.

18. The apparatus according to claim 17, wherein the decoder is further configured to:
after the second decoded image is obtained, write the second decoded image into the second memory, and overwrite the first decoded image with the second decoded image.

19. The apparatus according to claim 18, wherein the plurality of image layers further comprise a second enhancement layer, an image quality of the second enhancement layer is higher than an image quality of the first enhancement layer, and the decoder is further configured to:
- read a bitstream of a second enhancement layer of the first sub-image and the second decoded image from the second memory;
- decode the bitstream of the second enhancement layer of the first sub-image based on the second decoded image, to obtain a third decoded image, wherein the third decoded image is of the second enhancement layer of the first sub-image; and
- write the third decoded image into the second memory, and overwrite the second decoded image with the third decoded image.

20. The apparatus according to claim 17, wherein the decoder is further configured to:
- write a decoded image of a target image layer of the first sub-image into the first memory, wherein the target image layer is an image layer with highest image quality among the plurality of image layers.

* * * * *